US008047912B2

(12) United States Patent
Yoshizawa

(10) Patent No.: US 8,047,912 B2

(45) Date of Patent: Nov. 1, 2011

(54) GAMING MACHINE ACCEPTING SIDE BET AND CONTROL METHOD THEREOF

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 527 days.

(21) Appl. No.: 12/245,285

(22) Filed: Oct. 3, 2008

(65) Prior Publication Data

US 2009/0253493 A1 Oct. 8, 2009

Related U.S. Application Data

(60) Provisional application No. 61/028,287, filed on Feb. 13, 2008.

(51) Int. Cl.
*A63F 9/24* (2006.01)
*G06F 17/00* (2006.01)

(52) U.S. Cl. .......... 463/22; 273/274; 273/309; 273/130; 273/142 R; 463/16; 463/20; 463/25; 463/17

(58) Field of Classification Search ..................... 463/22
See application file for complete search history.

(56) References Cited

U.S. PATENT DOCUMENTS 5,263,715 A * 11/1993 Matsumoto et al. ............ 463/22
5,413,351 A 5/1995 Franklin
5,487,547 A 1/1996 Hobert
5,540,442 A * 7/1996 Orselli et al. ................... 463/17
5,746,432 A * 5/1998 Feola ............................ 273/274
5,775,993 A * 7/1998 Fentz et al. ...................... 463/17
5,924,926 A * 7/1999 Brown ............................ 463/11
5,947,472 A * 9/1999 Tang ......................... 273/142 R
6,302,395 B1 * 10/2001 Astaneha ...................... 273/274
6,364,314 B1 * 4/2002 Canterbury .................. 273/274
6,692,003 B2 2/2004 Potter et al.
7,377,513 B2 * 5/2008 Friedman ...................... 273/274
7,527,265 B1 * 5/2009 Berman ........................ 273/274
7,785,188 B2 * 8/2010 Cannon ........................... 463/20
2002/0135129 A1 * 9/2002 Tarantino ...................... 273/292
2005/0253334 A1 11/2005 Friedman
2007/0026930 A1 * 2/2007 Frost et al. ...................... 463/17
2007/0026947 A1 2/2007 Chun

FOREIGN PATENT DOCUMENTS

WO WO 2007/016776 A1 2/2007

OTHER PUBLICATIONS

Search Report and Office Action issued on Aug. 23, 2010 in the corresponding to the Macao Patent Application No. I/901.

* cited by examiner

*Primary Examiner* — Paul A. D'Agostino
(74) *Attorney, Agent, or Firm* — NDQ&M Watchstone LLP

(57) ABSTRACT

A gaming machine a controller programmed to execute the processing of accepting from an input device an input indicating placement of a normal BET, accepting from the input device an input indicating placement of a side BET, rolling and stopping a plurality of dice in a gaming portion, offering a normal payout based upon the outcomes of the stopped plurality of dice and the normal BET, and offering, in a case where a total value of the outcomes of the stopped plurality of dice stopped is a specific number, an additional payout based upon the specific number on condition that the input indicating placement of the side BET has been made.

4 Claims, 17 Drawing Sheets

GAMING MACHINE ACCEPTING SIDE BET AND CONTROL METHOD THEREOF

CROSS-REFERENCE TO RELATED APPLICATIONS

This application claims benefit of priority based on U.S. Provisional Patent Application No. 61/028,287 filed on Feb. 13, 2008. The contents of this application are incorporated herein by reference in their entirety.

BACKGROUND OF THE INVENTION

1. Field of the Invention

The present invention relates to a gaming machine accepting a side BET and a control method thereof.

2. Discussion of the Background

There have been conventionally known a variety of table games, and for example, as disclosed in WO 07/016,776-A1, US 2007/0026947-A1, and U.S. Pat. No. 5,413,351, a game genre called a dice game exists among those table games.

Among the dice games, there exists, for example, a gaming method in which a dealer throws dice after a player has performed a BET operation, and in the case where the dealer throws a predetermined combination, the player can throw dice to obtain a high payout, as disclosed in U.S. Pat. No. 5,413,351. Further, in Asia, Sic Bo is known as a long-time familiar dice game in which a player places a BET based on a prediction of the outcomes of three dice.

Sic Bo is widely known as an ancient Chinese dice game. In Sic Bo, a player places a BET based on a prediction of the outcomes of the respective three dice or a combination of the outcomes of the three dice. The way of placing a BET and payout rates are displayed on a table where a player is seated (or they may be displayed to an image display). The table is provided with: an area for placing a BET based on a prediction of the outcome of one die; an area for placing a BET based on a prediction that the outcomes of two dice will be the same; an area for placing a BET based on a prediction that the outcomes of the three dice will be the same; an area for placing a BET based on a prediction of a combination of the outcomes of two dice; an area for placing a BET based on a prediction of the total value of the outcomes of the three dice; and the like. As for the payout, although it cannot be uniformly set due to different circumstances of regions, countries, or the like, it has been set to the degree of 1:1 to 1:180 according to an appearance probability.

Since the dice game disclosed in U.S. Pat. No. 5,413,351 is executed according to a particular rule, there has been a problem that the game is unfamiliar to the player and lacks interesting aspects. Further, in typical Sic Bo widely known, types of BETs are limited and hence the player might soon be tired of the game.

An object of the present invention is to provide a gaming machine capable of enhancing interesting aspects of a game so as to prevent a player from becoming tired of the game, and a control method of the gaming machine.

The contents of WO 07/016,776-A1, US 2007/0026947-A1, and U.S. Pat. No. 5,413,351 are incorporated herein by reference in their entirety.

SUMMARY OF THE INVENTION

The present invention provides a gaming machine having the following configuration.

Namely, the gaming machine includes a gaming portion, an input device, and a controller.

In the gaming portion, a plurality of dice roll and stop. The input device is a device with which a player can place a normal BET on outcomes of the dice and a side BET different from the normal BET. The controller is programmed to execute the following processing (A) to (E):

(A) accepting from the input device an input indicating placement of the normal BET;

(B) accepting from the input device an input indicating placement of the side BET;

(C) rolling and stopping the plurality of dice in the gaming portion;

(D) offering a normal payout based upon the outcomes of the plurality of dice stopped in the processing (C) and the normal BET placed in the processing (A); and (E) offering, in a case where a total value of the outcomes of the plurality of dice stopped in the processing (C) is a specific number, an additional payout based upon the specific number, on condition that the input indicating placement of the side BET has been made in the processing (B).

According to the above-mentioned gaming machine, two kinds of BETs, which are a normal BET and a side BET, can be placed. When the side BET is placed, not only a normal payout based upon the normal BET but also an additional payout based upon the side BET can be offered. It is thereby possible to increase options in betting so that a game in which the player hardly feels bored can be provided.

Further, according to the above-mentioned gaming machine, in a case where a total value of the outcomes of dice is a specific number, the additional payout is offered based upon the specific number on condition that the side BET has been placed. Namely, the specific number is a condition for offering of the additional payout, and at the same time relates to the number of game media to be offered as the additional payout. Therefore, the specific number is of extreme importance for the player, and it is thereby possible to make the player have an interest in the specific number. This can thus improve the interesting aspect of the game.

Moreover, when the specific number is made to be a number considered to bring luck in a region where the gaming machine is installed (e.g. "8" in Japan and China), an interest of the player on such a specific number considered to bring luck can be further increased. It is thereby possible to make the player absorbed in the game so that it is possible to provide a game in which the player hardly feels bored even when the game is played for a long period of time.

The above-mentioned gaming machine desirably has the following configuration.

That is, the gaming machine has a display capable of displaying a card image showing a card corresponding to a number relating to the specific number. The input device is a device with which a player can make an input indicating selection of one card out of a plurality of the cards shown by a plurality of the card images displayed to the display. Moreover, the processing (E) includes processing of (E-1) displaying the plurality of card images to the display on such a mode that the numbers corresponding to the cards shown by the card images are invisible for the player on condition that the input indicating placement of the side BET has been made in the processing (B), in a case where the total value of the outcomes of the plurality of dice stopped in the processing (C) is the specific number, (E-2) accepting from the input device the input indicating selection of one card out of the plurality of the cards shown by the plurality of card images displayed in the processing (E-1), and (E-3) offering an additional payout to the player based upon the number corresponding to the card selected in the processing (E-2).

According to the above-mentioned gaming machine, when the total value of the outcomes of the dice is the specific number (e.g. 8), a plurality of card images are displayed to the display on condition that the side BET has been placed. The card shown by each card image is corresponded to a number relating to the specific number (e.g. 8, 18, 88, etc.), and the card images are displayed to the display on such a mode that the numbers are invisible for the player (i.e. facing downward). The player can select (turn over) one card. Based upon the number corresponding to the selected card, the additional payout is offered.

As thus described, since the number corresponding to the card selected by the player becomes a reference in determining an amount of the additional payout, selection of a card is a significant selection for the player. It is thus possible to make the player further enjoy the game through such a selection.

Further, since a number relating to the specific number is corresponded to each card, it is possible to further increase the interest of the player on the specific number.

Desirably, the above-mentioned gaming machine further has the following configuration.

Namely, the processing (E-3) is processing of paying game media in an amount obtained by multiplying an amount of game media placed on the side BET in the processing (B) by the number corresponding to the card selected in the processing (E-2).

According to the above-mentioned gaming machine, the larger the number of game media placed on the side BET is, the larger number of game media are paid as the additional payout. This can prompt the player to place the side BET with a large number of game media, thereby profit of a game parlor can be increased.

Further, according to the above-mentioned gaming machine, the larger the number corresponding to the selected card is, the larger number of game media are paid as the additional payout. Therefore, the player wishes to select a card corresponding to as large a number as possible. The larger the number corresponding to the card selected by the player is, the more pleasure the player can feel. It is thus possible to make the player absorbed in the game through such card selection.

Desirably, the above-mentioned gaming machine further has the following configuration.

Namely, the processing (E-3) is processing of executing a bonus game that is started when the total value of the outcomes of the plurality of dice stopped in the processing (C) has become the specific number, and paying game media in an amount calculated based upon a game result determined in the bonus game and the number corresponding to the card selected in the processing (E-2). Moreover, the processing (C) is processing of rolling and stopping the plurality of dice in the gaming portion during a period when the bonus game is not executed in the processing (E-3).

According to the above-mentioned gaming machine, triggered by the total value of the outcomes of the dice being the specific number, a bonus game is executed. In the bonus game, game media is paid in an amount calculated based upon a game result and the number corresponding to the selected card. Namely, the larger the number corresponding to the selected card is, the larger the number of game media to be paid during the bonus game becomes.

It is therefore possible to make the player have a sense of expectation that the total value of the outcomes of the dice will become the specific number and also make the player absorbed in selecting a card corresponding to as large a number as possible. Accordingly, a game in which the player hardly feels bored even when the game is played for a long period of time can be provided.

The present invention further provides a method for controlling a gaming machine having the following configuration.

Namely, the above method for controlling the gaming machine includes the steps of (A) accepting from an input device an input indicating placement of a normal BET; (B) accepting from the input device an input indicating a side BET different from the normal BET; (C) rolling and stopping a plurality of dice in a gaming portion; (D) offering a normal payout based upon the outcomes of the plurality of dice stopped in the step (C) and the normal BET placed in the step (A); and (E) offering, in a case where a total value of the outcomes of the plurality of dice stopped in the step (C) is a specific number, an additional payout based upon the specific number on condition that the input indicating placement of the side BET has been made in the step (B).

According to the above-mentioned control method, two kinds of BETs, which are the normal BET and the side BET, can be placed. When the side BET is placed, not only a normal payout based upon the normal BET but also an additional payout based on the side BET can be offered. It is thereby possible to increase options in placing a BET so that a game in which the player hardly feels bored can be provided.

Further, according to the above-mentioned control method, in the case where the total value of the outcomes of the dice is the specific number, an additional payout is offered based on the specific number on condition that the side BET has been placed. Namely, the specific number is a condition for offering of the additional payout, and at the same time relates to the number of game media to be offered as the additional payout. Therefore, the specific number is of extreme importance for the player, and it is thereby possible to make the player have an interest in the specific number. This can thus improve the interesting aspect of the game.

Moreover, when the specific number is made to be a number considered to bring luck in a region where the gaming machine is installed (e.g. "8" in Japan and China), an interest of the player on such a specific number considered to bring luck can be further increased. It is thereby possible to make the player absorbed in the game so that a game in which the player hardly feels bored even when the game is played for a long period of time can be provided.

DESCRIPTION OF THE EMBODIMENTS

Figure 1A:
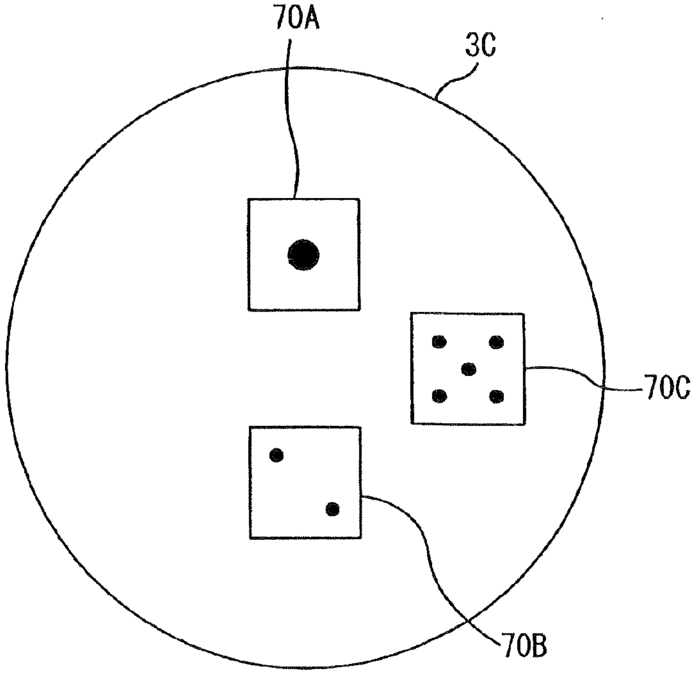
FIG. 1A is a view showing outcomes of dice obtained as a result of throwing the dice.
Figure 1B:
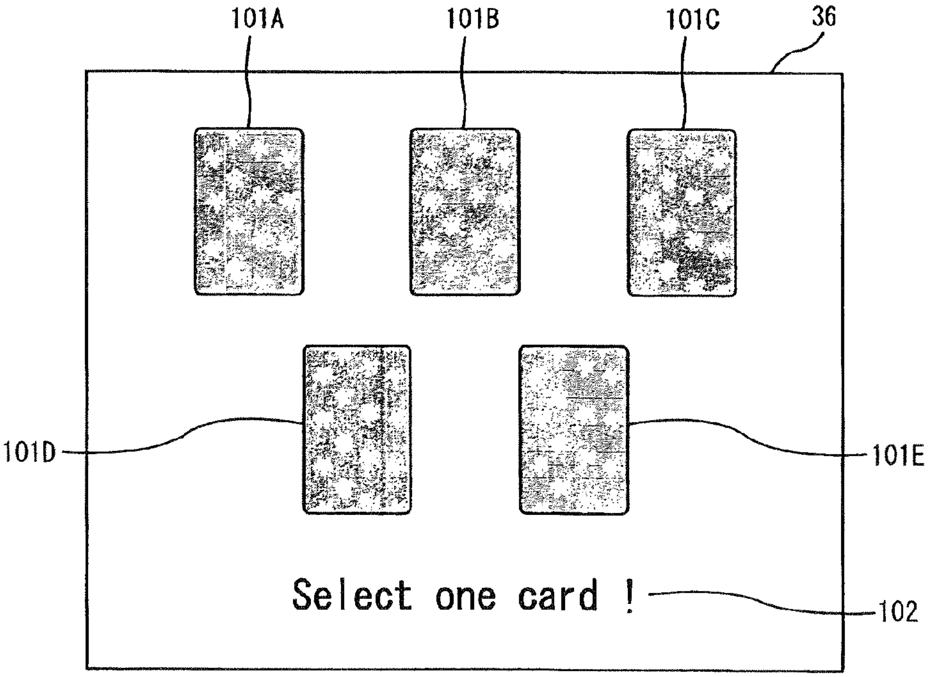
FIG. 1B is a view showing one example of a display screen displayed to the image display.
Figure 1C:
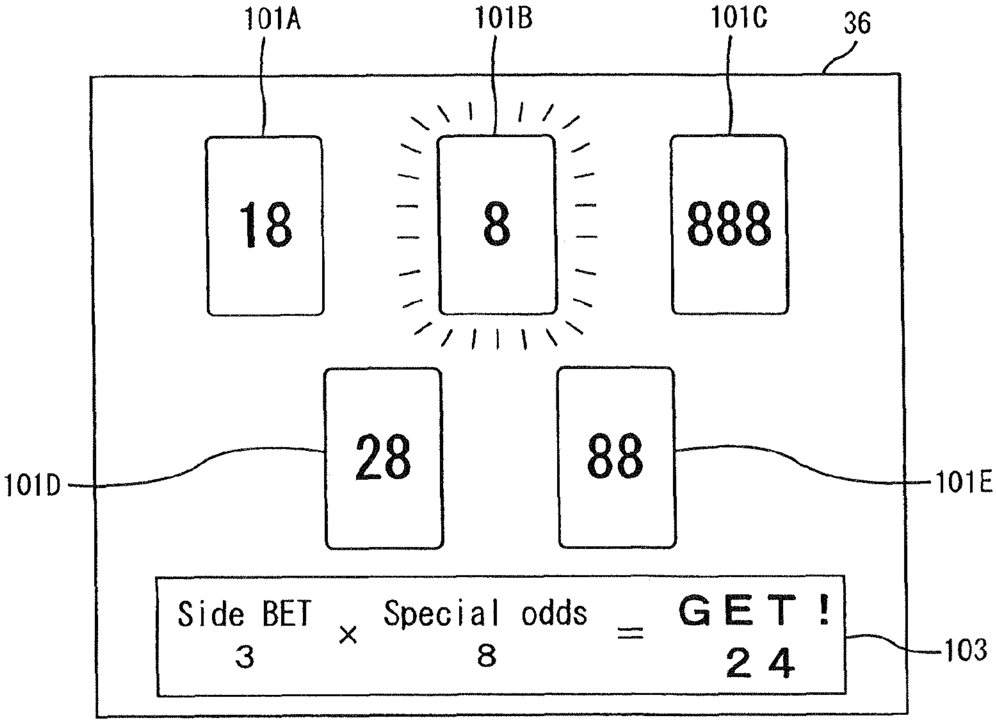
FIG. 1C is a view showing one example of a display screen displayed to the image display.

First, a general description of the present embodiment is given using FIGS. 1A to 1C.

FIG. 1A is a view showing the outcomes of dice obtained as a result of throwing the dice.

FIGS. 1B and 1C are views each showing one example of display screens displayed to an image display.

In a gaming machine 1 (see FIG. 2) according to the present embodiment, three dice are used to perform a dice game (Sic Bo). A player can place a normal BET while predicting the outcomes of the dice (see FIG. 6). A normal payout is then offered based upon the outcomes of the dice and the normal BET.

Further, the player can place a BET with an arbitrary number of game media as a side BET. When a total value of the outcomes of the dice becomes a specific number (8 in the present embodiment) (see FIG. 1A), on an image display 7 (see FIG. 2) in a station 4 where the side BET was placed, card images 101A to 101E showing five cards facing downward are displayed as shown in FIG. 1B. Further, a letter image 102 showing that one card can be selected is displayed. The player playing the game in the station 4 can select one card by touching a place on a touch panel which corresponds to the card image showing the card the player wishes to select.

When the player selects one card, as shown in FIG. 1C, the mode of displaying the card images 101A to 101E changes so as to display the cards facing upward. Numbers 18, 8, 888, 28, and 88 are displayed respectively on the card images 101A to 101E. These numbers "18", "8", "888", "28", and "88" correspond to numbers relating to the specific number in the present invention. In the example shown in FIG. 1C, a state is shown where the card shown by the card image 101B has been selected by the player. The number displayed on the card selected by the player is determined as special odds. The special odds are a value to be referenced in offering of an additional payout.

Further, in FIG. 1C, a first additional payout amount-determining image 103 is displayed. The first additional payout amount-determining image 103 shows a state where the player has been able to acquire, as the additional payout, game media in number (24) obtained by multiplying the number (3) of game media placed on the side BET by the special odds (8).

Moreover, in the present embodiment, a free game is performed in the station 4 where the side BET has been placed when the total value of the outcomes of the dice becomes the specific number (8), although not shown in FIG. 1. During the period of the free game, the player can play a game without placing the normal BET. Among dice games played in the present embodiment, games other than the free game are referred to as normal games in the specification.

In the free game, game media are paid in an amount corresponding to an amount obtained by multiplying a standard payout amount by the special odds. A calculation method for the standard payout amount is similar to that for the normal payout amount. Namely, an amount corresponding to the normal payout amount in the normal game is referred to as the standard payout amount in the free game. Further, an amount of game media paid during the free game is referred to as a second additional payout amount in the specification. Paying out game media in an amount obtained by adding the first additional payout amount and the second additional payout amount corresponds to offering of the additional payout in the present invention.

As thus described, the gaming machine 1 according to the present embodiment is configured such that the number of game media (additional payout amount), which can be obtained due to the total value of the outcomes of the dice becoming the specific number (8), varies depending upon the number displayed on the card selected by the player.

The above configuration is the general description of the present embodiment.

In the following, the present embodiment is further specifically described.

Figure 2:
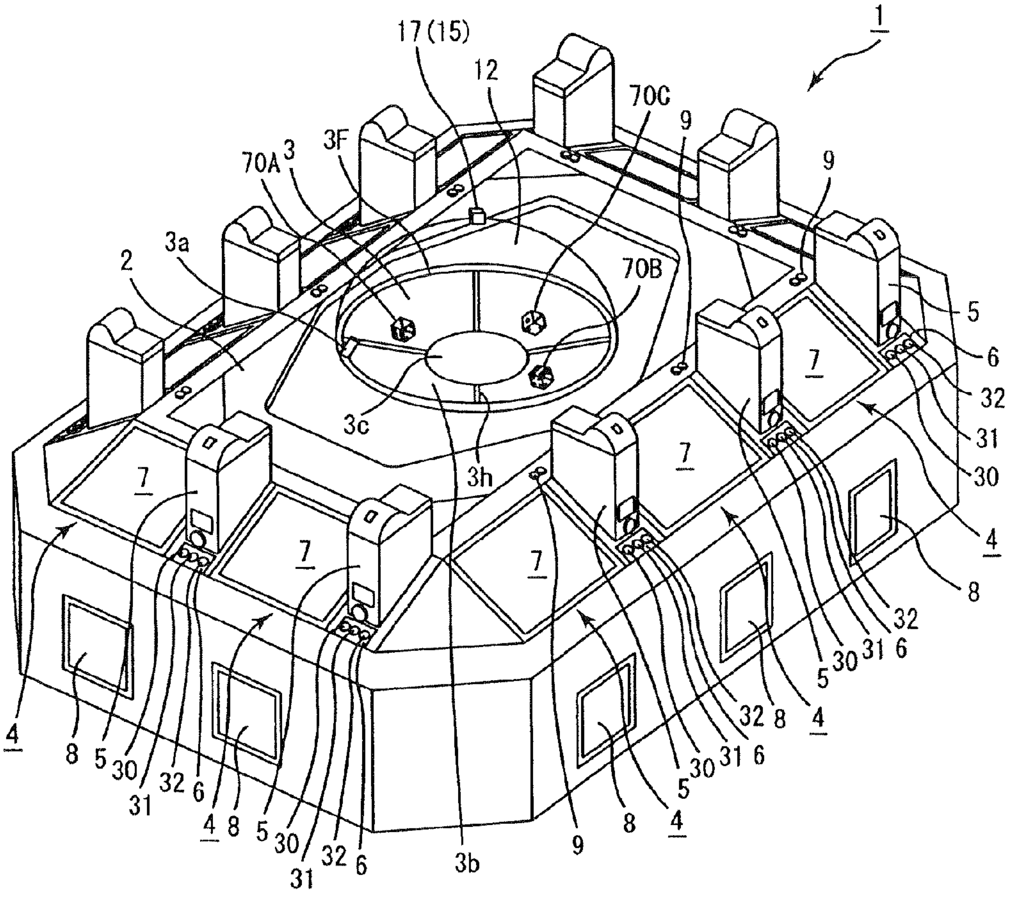
FIG. 2 is a perspective view schematically showing one example of a gaming machine according to the present invention.

FIG. 2 is the perspective view schematically showing one example of the gaming machines according to the present invention.

Figure 3:
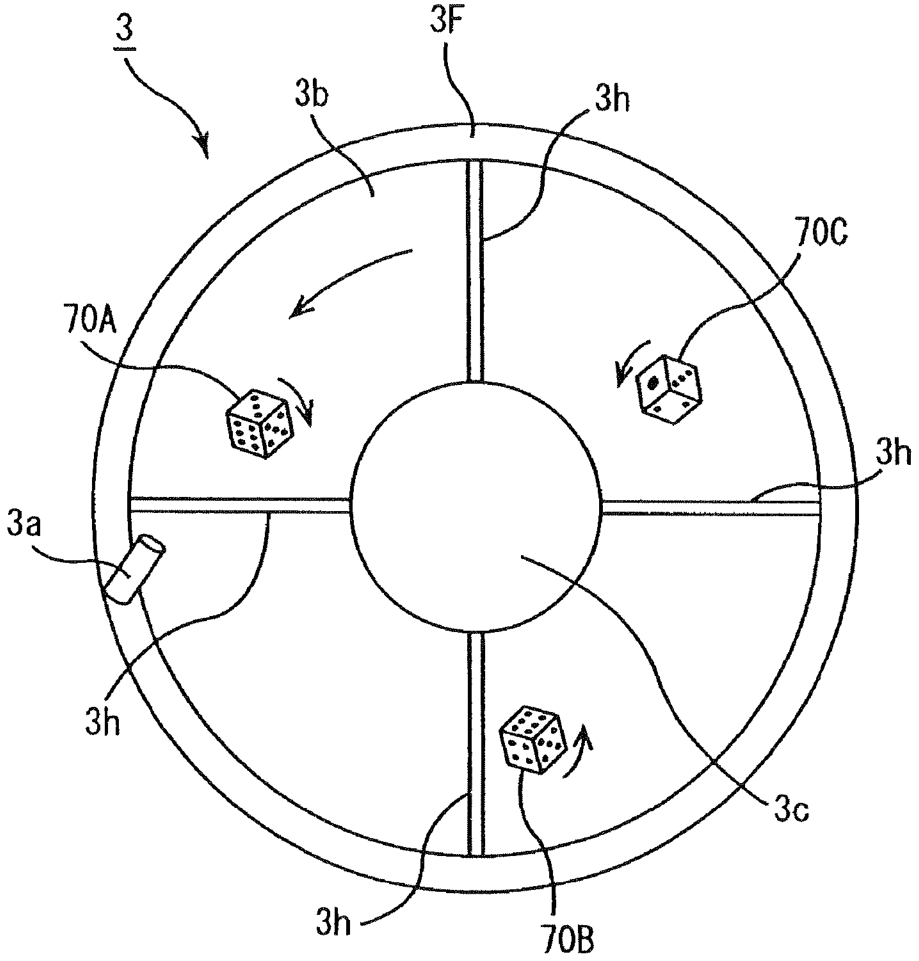
FIG. 3 is an enlarged view of a gaming portion of the gaming machine shown in FIG. 2.

FIG. 3 is an enlarged view showing the gaming portion of the gaming machine shown in FIG. 2.

Figure 4:
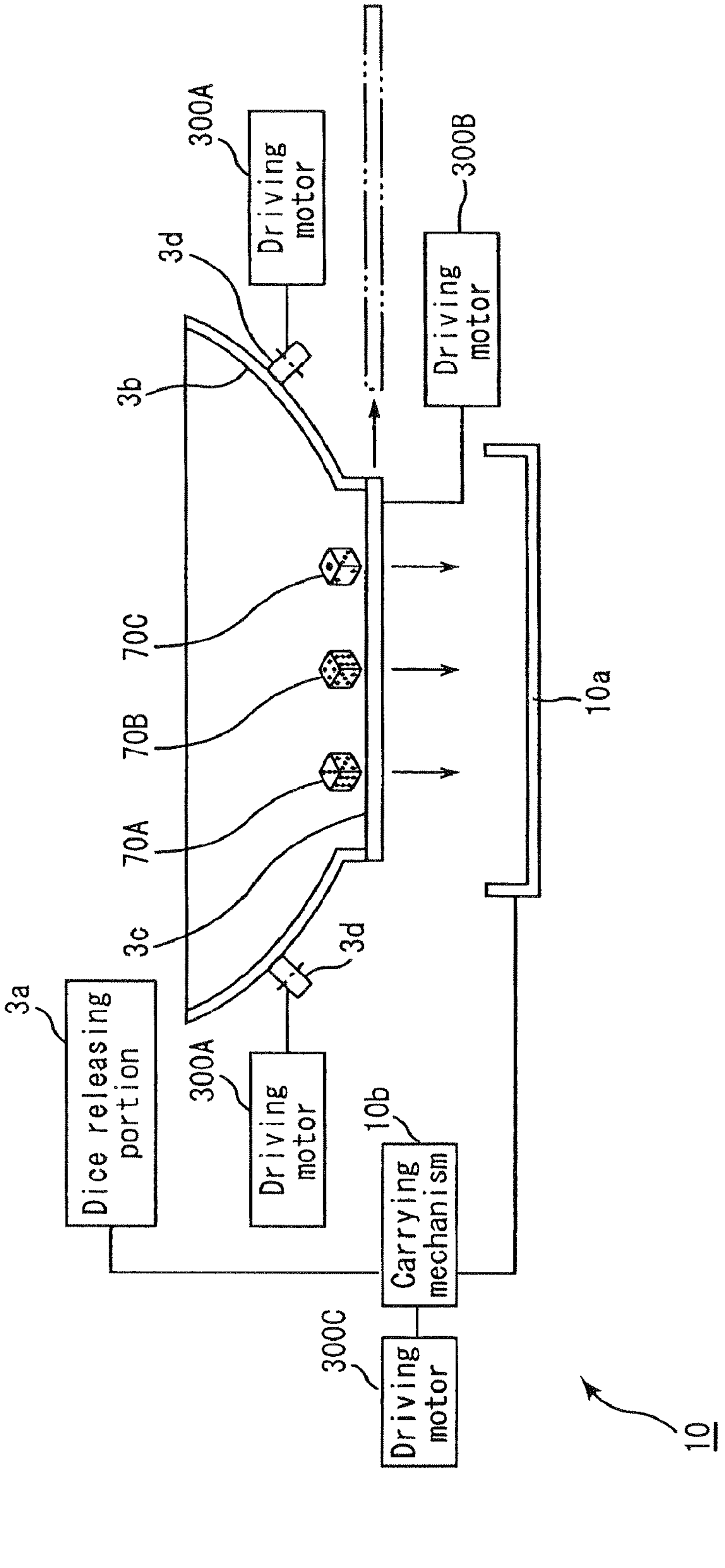
FIG. 4 is a view schematically showing a channel from collection to release of dice in the gaming portion.

FIG. 4 is a view schematically showing a channel from collection to release of the dice in the gaming portion.

As shown in FIG. 2, the gaming machine of the present embodiment includes a cabinet 2 serving as a main body portion, a gaming portion 3 in which a plurality of dice 70 roll and stop, disposed almost at the center of the upper surface of the cabinet 2, and a plurality of stations 4 (10 units in the present embodiment) disposed so as to surround the gaming portion 3. Each of the stations 4 includes an image display 7. A player seated at each of the stations takes part in a game by putting in a normal BET and a side BET based on a prediction of the outcomes of the dice 70.

Each of the stations 4 includes a game media accepting device 5 into which game media such as medals for use in a game are inserted, a control portion 6 having a plurality of control buttons and the like, with which a player inputs predetermined commands, and the image display 7 to which an image regarding a BET table and the like are displayed. The player can participate in a game by operating the control portion 6 while watching the image displayed to the image display 7.

On the side surfaces of the cabinet 2 where the stations 4 are installed, there are provided for each station 4 a payout exit 8 from which the game media are paid out. Further, on the right side above the image display 7 of each station 4, speakers 9 capable of outputting a sound are provided.

The control portion 6 is provided beside the image display 7 of the station 4. In the control portion 6, a confirmation button 30, a payback button 31 and a help button 32 are arranged in the order from the left, when seen from a position facing to the station 4.

The confirmation button 30 is pressed when a BET operation is confirmed after the BET operation has been performed. Further, for operations other than the BET operations, the player also presses the confirmation button 30 to confirm an input that the player has made.

The payback button 31 is typically pressed after a game has been ended. When the payback button 31 is pressed, game media according to credits owned by the player is paid back from the payout exit 8.

The help button 32 is pressed when the game playing manner or the like is unclear. Immediately after the help button 32 is pressed, a help image showing information on a variety of operations is displayed to the image display 7.

In the gaming portion 3, the plurality of the dice 70 are rolled and stopped. In the present embodiment, the gaming machine 1 has a configuration in which three dice 70 (a die 70A, a die 70B and a die 70C) are used in the gaming portion 3.

The gaming portion 3 is formed in a circular shape and includes a dice releasing portion 3*a* from which the dice 70 are released, a rotating plate 3*b* that rotates the dice 70 sequentially released from the dice releasing portion 3*a*, and a stopping plate 3*c* that finally stops the dice 70 rotating on the rotating plate 3*b*.

The dice releasing portion 3*a* is installed in a circular outer frame 3F configuring the gaming portion 3, and from here, the dice 70A to 70C are sequentially (or simultaneously) released toward the rotating plate 3*b*. It is to be noted that in FIGS. 2 and 3, the dice 70 are drawn in a large size as compared with the dice releasing portion 3*a* for the sake of facilitating the description.

The rotating plate 3*b* has a shape of a truncated cone, as shown in FIG. 4. On the lower surface portion of the rotating plate 3*b*, a plurality of driving rollers 3*d* are rotatably provided in a state in contact with the rotating plate 3*b*. Simultaneously with start of a game, the plurality of the rotating rollers 3*d* are rotationally driven by a rotating-plate driving motor 300A, to rotationally drive the rotating plate 3*b*. It is to be noted that on the front surface of the rotating plate 3*b*, projections 3*h* are provided at predetermined intervals, which flip the respective dice so as to facilitate rolling thereof when the rotating plate 3*b* is rotationally driven.

The stopping plate 3*c* is configured in a circular plate shape at the bottom portion of the rotating plate 3*b* having a shape of a truncated cone, and is an area where the dice 70 rotating on the rotating plate 3*b* finally stop after dropping along the inclination of the rotating plate 3*b* following the stop of the rotating plate 3*b*. Namely, the dice 70 released from the dice releasing portion 3*a* rotate on the surface of the rotating plate 3*b* by rotation of the rotating plate 3*b*, and drop along the inclination of the rotating plate 3*b* with the stop of the rotating plate 3*b*. Then, the dice 70 finally stop on the stopping plate 3*c*.

As shown in FIG. 4, the stopping plate 3*c* is configured to be slidingly driven by a stopping-plate driving motor 300B. With the stopping plate 3*c* slidingly driven, the dice 70 drop toward a collection/release mechanism 10.

The collection/release mechanism 10 includes: a housing portion 10*a* that receives the dice 70 having dropped from the stopping plate 3*c*; a carrying mechanism 10*b* that carries the dice 70 inside the housing portion 10*a* toward the dice releasing portion 3*a*; and a carriage driving motor 300C that drives the carrying mechanism 10*b*. The configuration of the collection/release mechanism 10 is not limited to a specific form, so long as it is a configuration capable of collecting the dice 70 after a later-described outcome detecting device 15 has completed detection of the outcomes of the respective dice 70 having stopped on the stopping plate 3*c*, and releasing the dice 70 from the dice releasing portion 3*a*, toward the rotating plate 3*b*. Namely, for example, the carrying mechanism 10*b* can be conducted in a variety of forms, such as a configuration in which the carrying mechanism 10*b* carries the dice 70 by air pressure from the housing portion 10*a* toward the dice releasing portion 3*a*, and a configuration in which the carrying mechanism 10*b* carries the dice 70 by a conveyor-like carrier from the housing portion 10*a* toward the dice releasing portion 3*a*.

The gaming portion 3 is covered at its whole upper portion by a hemispheric covering member 12 made of transparent acrylic, and the rotating range of the dice 70 is regulated. In the present embodiment, the outcome detecting device 15 that detects the outcomes of the dice 70 is installed on the top of the covering member 12. It is to be noted that in FIG. 2, the covering member 12 is drawn so as to cover only part of the gaming portion 3 for the sake of facilitating the description.

Figure 5:
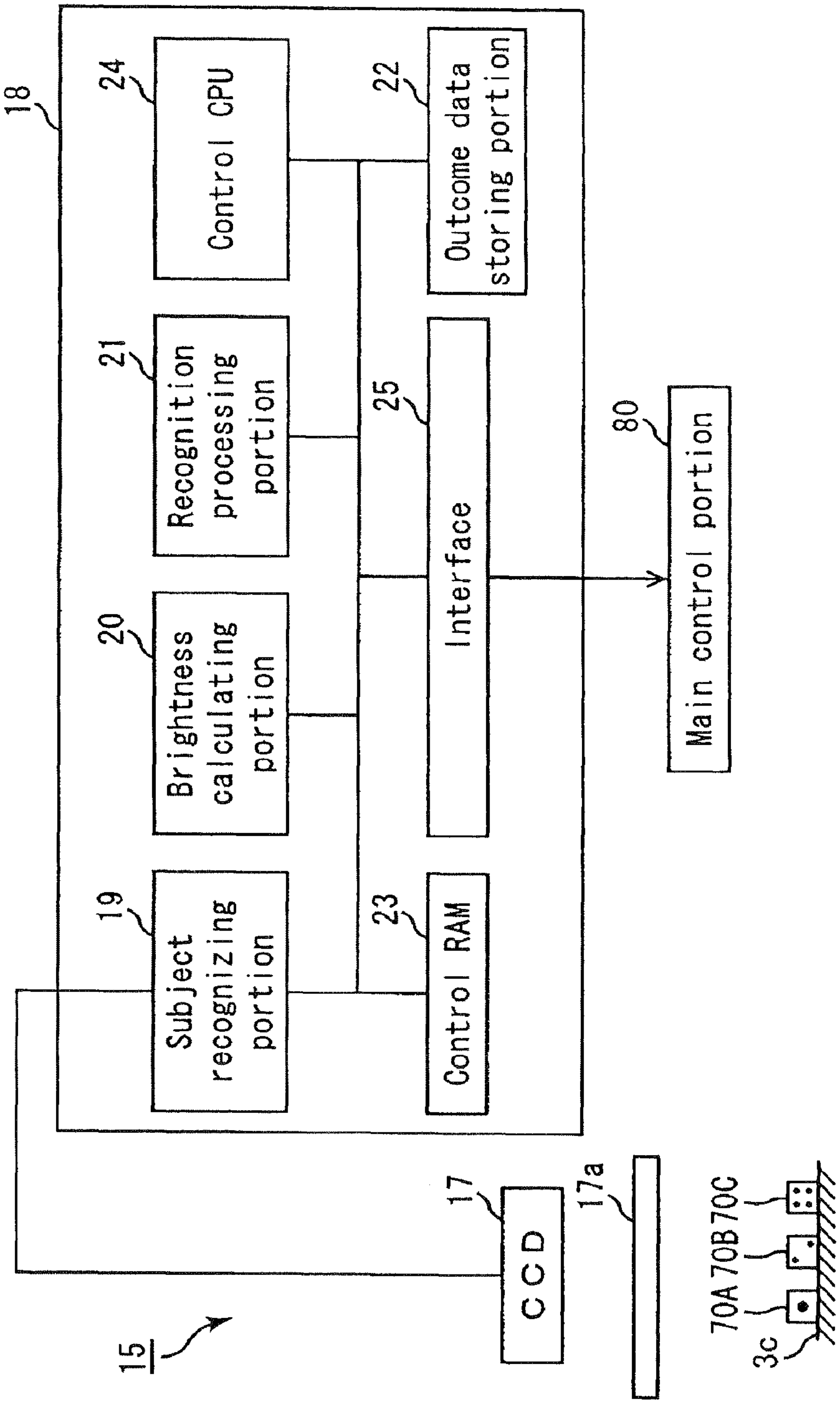
FIG. 5 is a block diagram showing an internal configuration of an outcome detecting device in the gaming machine shown in FIG. 2.

FIG. 5 is a block diagram showing an internal configuration of the outcome detecting device in the gaming machine shown in FIG. 2.

The outcome detecting device 15 in the present embodiment includes an imaging device (CCD camera) 17 that photographs the dice 70 being the object to be photographed, and an outcome detecting circuit 18 that processes the imaging signal from the imaging device 17 and then detects the outcomes of the dice 70.

The imaging device 17 is previously made by a focus lens 17*a* to have a focus consistent with the stopping plate 3*c* in order to photograph the dice 70 on the stopping plate 3*c*, and is exposure-controlled. The outcome detecting circuit 18 includes: a subject recognizing portion 19 that receives an imaging signal from the imaging device 17 to recognize a position of a subject (dice 70); a brightness calculating portion 20 that calculates brightness of the image of the subject (image of the dice) recognized in the subject recognizing portion 19; a recognition processing portion 21 that identifies the outcomes of the dice 70; an outcome data storing portion 22 in which comparison data regarding the outcomes of the dice 70 is stored; a control RAM 23; and a control CPU 24 that controls these units. These units are connected to one another through a bus, and each of these units is controlled by the control CPU 24.

From the imaging signal of the dice 70 received from the imaging device 17, intensity distribution of the image is measured in the subject recognizing portion 19. Measuring the intensity distribution allows identification of the positions of the dice 70 on the stopping plate 3*c* and the surface states of the dice 70. In the recognition processing portion 21, the identified data is subjected to processing of comparison with the comparison data previously stored in the outcome data storing portion 22, to identify the outcomes of the dice 70.

The identified outcome information is stored into the control RAM 23, and transmitted to a later-described main control portion 80 through an interface 25. Namely, the outcome detecting device 15 identifies the outcomes of the three dice 70 having stopped in the gaming portion 3, and transmits the identified outcome information to the main control portion 80.

Figure 6:
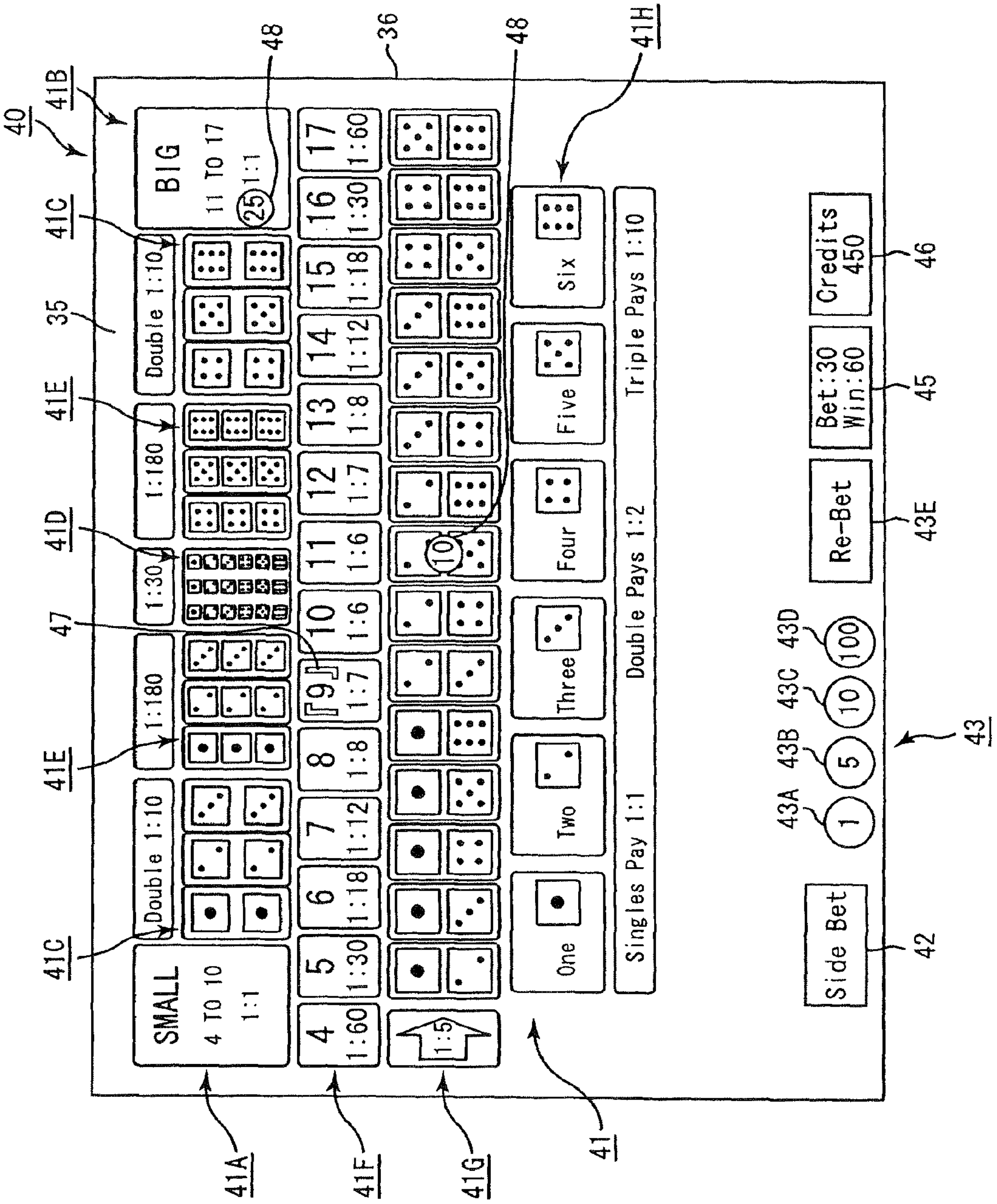
FIG. 6 is an exemplary view showing a display screen displayed to the image display.

FIG. 6 is an exemplary view showing the display screen displayed to the image display.

As shown in FIG. 6, the image display 7 is a touch-panel-type liquid crystal display having a touch panel 35 installed on its front surface. The player can select an icon and the like displayed to the liquid crystal screen 36 by touching the touch panel 35 with his/her finger or the like. The touch panel 35 corresponds to the input device in the present invention.

During the game, a table-type betting board (BET screen) 40 to be used for predicting the outcomes of the dice 70 is displayed at a predetermined timing.

The following describes the BET screen 40 in more detail. On the BET screen 40, a plurality of normal BET areas 41 (normal BET area 41A, normal BET area 41B, normal BET area 41C, normal BET area 41D, normal BET area 41E, normal BET area 41F, normal BET area 41G, normal BET area 41H) and a side BET area 42 are displayed. A normal BET operation is performed by touching the touch panel 35 with a finger or the like to specify the normal BET area 41, and making chips displayed on the specified normal BET area 41. Further, a side BET operation is performed by touching the touch panel 35 with a finger or the like to specify the side BET area 42, and making chips displayed on the specified side BET area 42.

In the right portion of the side BET area 42, there are displayed a unit BET button 43, a Re-BET button 43E, a payback result display portion 45, and a number-of-credits display portion 46 in order from the left.

The unit BET button 43 is used for betting a chip on the normal BET area 41 and the side BET area 42 specified by the player. The unit BET button 43 is configured by four types of buttons: a 1-BET button 43A; a 5-BET button 43B; a 10-BET button 43C; and a 100-BET button 43D. It is to be noted that, when the BET operation is wrongly performed, it can be performed again by touching a Re-BET button 43E with the finger or the like.

The player first touches the touch panel 35 with the finger or the like to specify the normal BET area 41 or the side BET area 42 by using a cursor 47. At this state, touching the 1-BET button 43A with the finger or the like enables the player to BET one chip at a time (the number of BETs increases in order of 1, 2, 3, and so forth every time the 1-BET button 43A is touched with the finger or the like). Similarly, touching the 5-BET button 43B with the finger or the like enables the player to BET five chips at a time (the number of BETs increases in order of 5, 10, 15, and so forth every time the 5-BET button 43B is touched with the finger or the like). Touching the 10-BET button 43C with the finger or the like enables the player to BET ten chips at a time (the number of BETs increases in order of 10, 20, 30, and so forth every time the 10-BET button 43C is touched with the finger or the like) Touching the 100-BET button 43D with the finger or the like enables the player to BET one hundred chips at a time (the number of BETs increases in order of 100, 200, 300, and so forth every time the 100-BET button 43D is touched with the finger or the like). The number of BET chips up to the present moment is displayed as a chip mark 48, and a number displayed within the chip mark 48 shows the number of BETs of chips.

In a payback result display portion 45, the number of BETs of chips of the player and the number of payback credits in the previous game are displayed. A number obtained by subtracting the number of BETs from the number of payback credits indicates the number of credits newly acquired by the player in the previous game.

In the number-of-credits display portion 46, the number of credits owned by the player is displayed. This number of credits decreases according to the number of BETs (one credit per one chip) when chips are BET. Further, when the BET chips are won and credits are paid back, the number of credits increases by the number of the paid back credits. It is to be noted that, when the number of credits becomes 0, the game is ended.

Next, the normal BET areas 41 on the BET screen 40 are described.

The normal BET areas 41A, 41B are portions used when the player places a BET based on a prediction of the total value of the dice 70A to 70C. Namely, the normal BET area 41A is selected when the total value is predicted to be 4 to 10, and the normal BET area 41B is selected when the total value is predicted to be 11 to 17. The payout is set to 1:1 (two chips are paid out with respect to one BET).

The normal BET area 41C is a portion used when the player places a BET based on a prediction that the outcomes of two dice 70 out of the three dice 70 will be the same. Namely, the normal BET area 41C is used when the player places a BET based on a prediction that any of the combinations of the outcomes (1, 1), (2, 2), (3, 3), (4, 4), (5, 5) and (6, 6) will appear, out of the outcomes of the three dice 70; here, the payout is set to 1:10.

The normal BET area 41D is a portion used when the player places a BET based on a prediction that all of the outcomes of the three dice 70 will be the same. Namely, the normal BET area 41D is used when the player places a BET based on a prediction that the outcomes of the three dice 70 will be any of (1, 1, 1), (2, 2, 2), (3, 3, 3), (4, 4, 4), (5, 5, 5) and (6, 6, 6). The payout is set to 1:30.

The normal BET area 41E is a portion used when the player places a BET based on a prediction that all of the outcomes of the three dice 70 will be the same, and a prediction of the value that the three dice 70 will have. Namely, the normal BET area 41E is used when the player places a BET based on a prediction that the outcomes of the three dice 70 will be (1, 1, 1), (2, 2, 2), (3, 3, 3), (4, 4, 4), (5, 5, 5) or (6, 6, 6) and also a prediction of the value that the three dice 70 will have. The payout is set to 1:180.

The normal BET area 41F is a portion used when the player places a BET based on a prediction of the total value of the three dice 70. The payout is set according to an appearance probability of the total value: the payout is 1:60 when the total value is 4 or 17; 1:30 when the total value is 5 or 16; 1:18 when the total value is 6 or 15; 1:12 when the total value is 7 or 14; 1:8 when the total value is 8 or 13; 1:7 when the total value is 9 or 12; and 1:6 when the total value is 10 or 11.

The normal BET area 41 G is a portion used when the player places a BET based on a prediction of the outcomes of two dice 70 out of the three dice 70. The payout is set to 1:5.

The normal BET area 41H is a portion used when the player places a BET based on a prediction of the outcome of at least one die 70 out of the dice 70; the payout is set according to the number of the dice 70 with the outcome corresponding to the predicted outcome.

Figure 7:
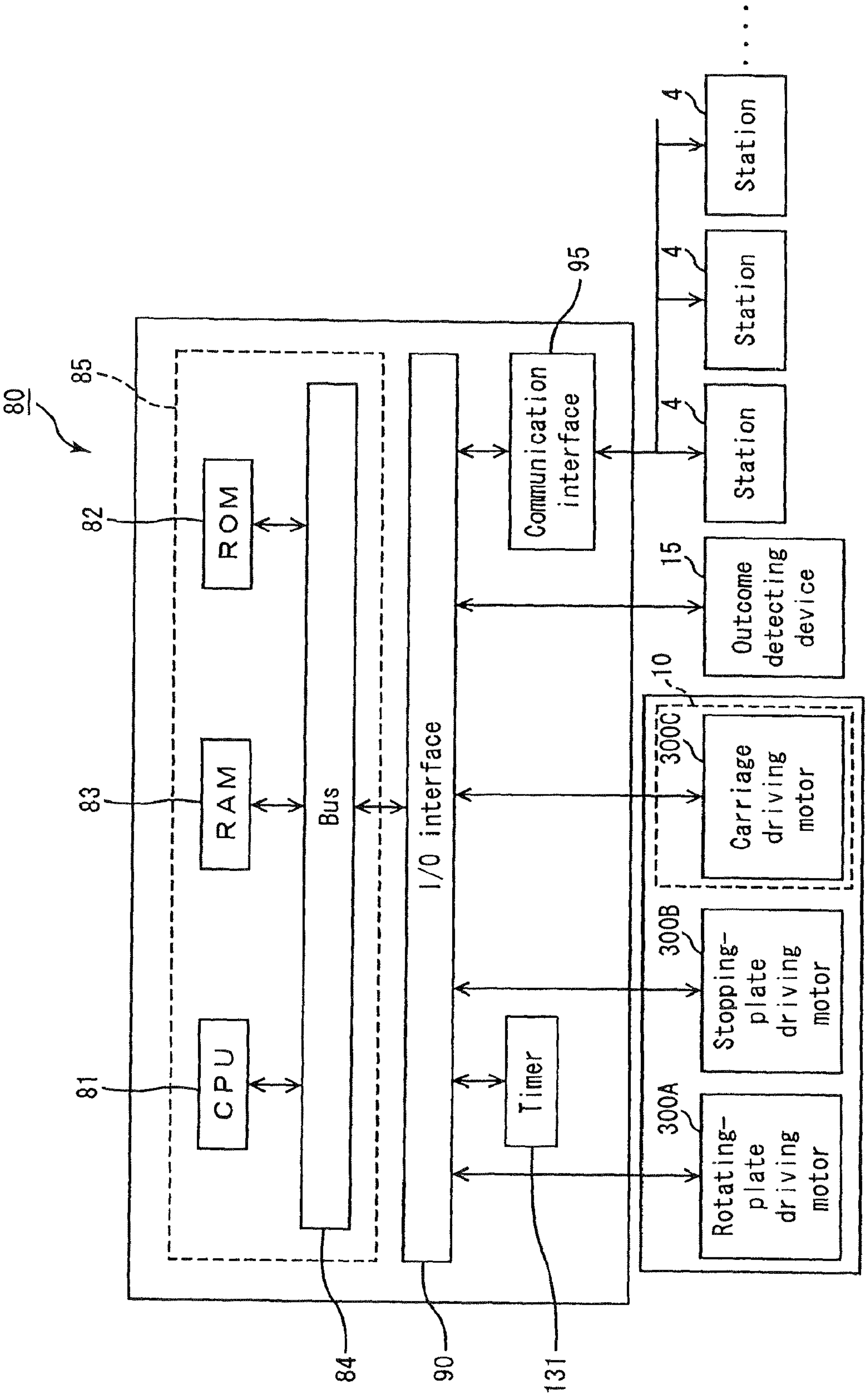
FIG. 7 is a block diagram showing an internal configuration of the gaming machine shown in FIG. 2.

FIG. 7 is a block diagram showing an internal configuration of a main control portion 80 in the gaming machine shown in FIG. 2.

The main control portion 80 of the gaming machine 1 has a microcomputer 85, which mainly comprises a CPU 81, a ROM 82, a RAM 83, and a bus 84 that transfers data mutually thereamong.

The CPU 81 is connected to the rotating-plate driving motor 300A, the stopping-plate driving motor 300B and the carriage driving motor 300C, through an I/O interface 90. Further, through the I/O interface 90, the CPU 81 is connected to a timer 131 capable of measuring time. The I/O interface 90 is also connected with the foregoing outcome detecting device 15, and transmits and receives information on the outcomes of the three dice 70 having stopped on the stopping plate 3*c*, and the like, to and from the outcome detecting device 15. Moreover, the I/O interface 90 is connected with a communication interface 95; through this communication interface 95, the main control portion 80 transmits and receives data such as BET information, and payout information, to and from each station 4.

The ROM 82 of the main control portion 80 stores programs for realizing a basic function of the gaming machine 1, specifically a program for controlling a variety of devices for driving the gaming portion 3, a program for controlling each station 4, and the like, and also stores a payout table, data showing predetermined time T, data showing a specific value TT, and the like.

The RAM 83 is a memory that temporarily stores a variety of data calculated in the CPU 81. For example, the RAM 83 temporarily stores BET information transmitted from each station 4, information on the outcomes of the dice 70 transmitted from the outcome detecting device 15, data on results of processing executed by the CPU 81, and the like.

Based on the data and programs stored in the ROM 82 and the RAM 83, the CPU 81 controls the rotating-plate driving motor 300A, the stopping-plate driving motor 300B and the carriage driving motor 300C which drive the gaming portion 3, throws the dice 70 onto the rotating plate 3*b* of the gaming portion 3, and performs some other operations. Further, the CPU 81 executes control processing associated with the proceeding of the game, such as processing of checking the outcome of each of the dice 70 having stopped on the stopping plate 3*c*.

In addition to the control processing associated with the proceeding of the game, the CPU 81 has the function of controlling each station 4 so as to make the game proceed, by transmitting and receiving data to and from each station 4. Specifically, the CPU 81 receives BET information transmitted from each station 4. Further, based on the outcomes of the dice 70 and the BET information transmitted from each station 4, the CPU 81 performs winning determination processing, to calculate an amount of payout to be paid out at each station 4 with reference to the payout table stored in the ROM 82.

Figure 8:
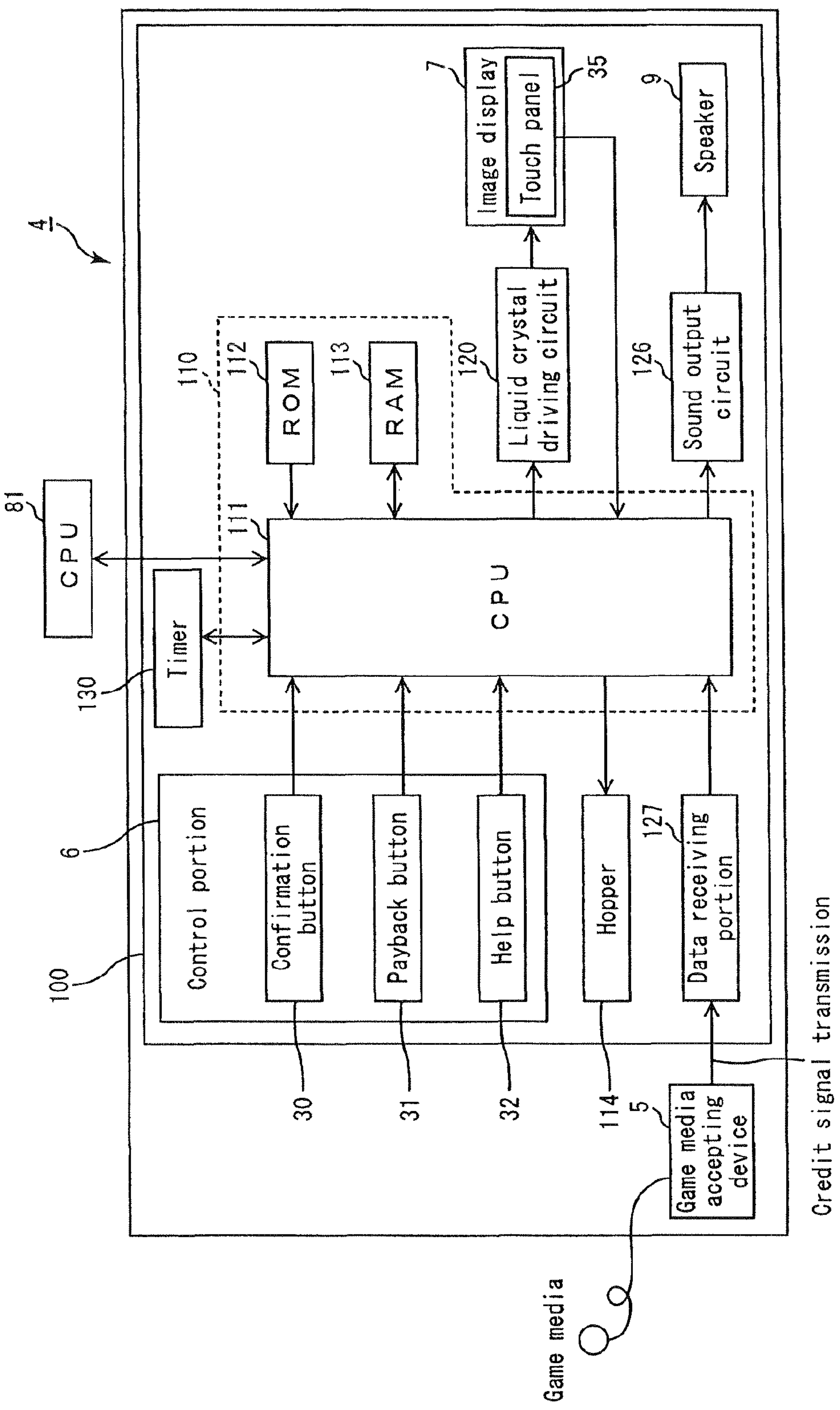
FIG. 8 is a block diagram showing an internal configuration of one of the stations shown in FIG. 2.

FIG. 8 is a block diagram showing an internal configuration of the station shown in FIG. 2.

The station 4 includes a main body portion 100 provided with the image display 7 and the like, and the game media accepting device 5 installed on the main body portion 100. Further, the main body portion 100 includes a station-controlling portion 110 and several peripheral devices.

The station-controlling portion 110 includes a CPU 111, a ROM 112, and a RAM 113.

The ROM 112 stores a program for realizing a basic function of the station 4, a variety of programs necessary for controlling the station 4, a data table, and the like.

The RAM 113 is a memory that temporarily stores a variety of data calculated in the CPU 111, the number of credits owned by the player, the state of the BET placed by the player, a variety of flags, and the like. The RAM 113 is provided with a special odds storing region and a number-of-free-games storing region. In the special odds storing region, special odds data showing special odds are stored. As described above, the special odds are a value to be referenced in offering of the additional payout. In the number-of-free-games storing region, data showing the remaining number of free games is stored.

The CPU 111 is connected separately with the confirmation button 30, the payback button 31, and the help button 32 which are provided in the control portion 6. Further, based on an operation signal output at the press of each button or the like, the CPU 111 performs control so as to execute a variety of operations corresponding to the signal. Specifically, the CPU 111 executes a variety of processing, based on an input signal that is supplied from the control portion 6 when the player has input an operation and on the data and programs stored in the ROM 112 and the RAM 113, and transmits the results of the processing to the CPU 81 of the main control portion 80.

Further, the CPU 111 receives a command signal from the CPU 81 of the main control portion 80, to control the peripheral devices constituting the station 4. Moreover, the CPU 111 executes a variety of processing, based on input signals supplied from the control portion 6 and the touch panel 35 and on the data and programs stored in the ROM 112 and the RAM 113. Based on the results of the processing, the CPU 111 controls the peripheral devices constituting the station 4. It is to be noted that which method is to be applied in performing the processing is set for each processing according to the content of the processing. For example, the processing of paying out game media corresponds to the former, and the BET operation processing by the player corresponds to the latter.

The CPU 111 is connected with a hopper 114, and the hopper 114 pays out a predetermined number of game media from the payout exit 8 based on a command signal from the CPU 111.

The CPU 111 is connected with the image display 7 through a liquid crystal driving circuit 120. The liquid crystal driving circuit 120 includes a program ROM, an image ROM, an image control CPU, a work RAM, a VDP (video display processor), a video RAM, and the like. The program ROM stores an image control program regarding display to the image display 7 and a variety of selection tables. The image ROM stores, for example, dot data for forming an image displayed to the image display 7, and dot data for displaying a card image 101. Further, based on parameters set in the CPU 111, the image control CPU determines an image to be displayed to the image display 7 out of the dot data previously stored inside the image ROM, according to the image control program previously stored inside the program ROM. Moreover, the work RAM is configured as a temporary storage device in execution of the image control program in the image control CPU. Further, the VDP forms an image according to the display contents determined by the image control CPU, and outputs the image to the image display 7. It is to be noted that the video RAM is configured as a temporary storage means in formation of an image by the VDP.

The touch panel 35 is installed on the front surface of the image display 7, as described above, and information on the operation of the touch panel 35 is transmitted to the CPU 111. The touch panel 35 detects an input operation performed by the player on the BET screen 40 and the like. Specifically, selection of the normal BET areas 41 of the BET screen 40 and the side BET area 42, input using the unit BET buttons 43 and the like are performed by the operation of touching the touch panel 35, and the information of the operation is transmitted to the CPU 111. Based on the information, BET information of the player is stored in the RAM 113. Further, the BET information is transmitted to the CPU 81 of the main control portion 80, and stored in the BET information storage area in the RAM 83.

Further, the sound output circuit 126 and the speakers 9 are connected to the CPU 111, and the speakers 9 generate a variety of effect sounds when a variety of effects are produced based on output signals from the sound output circuit 126. Moreover, the CPU 111 is connected with the game media accepting device 5 functioning as a device into which game media such as medals or currency are inserted through a data receiving portion 127. The data receiving portion 127 receives a credit signal transmitted from the game media accepting device 5, and the CPU 111 increases the number of credits of the player stored in the RAM 113 based on the transmitted credit signal.

The CPU 111 is connected with a timer 130 capable of measuring time.

Subsequently, processing executed in the gaming machine according to the present embodiment is described using FIGS. 9 to 12.

First, processing performed in the main control portion is described.

Figure 9:
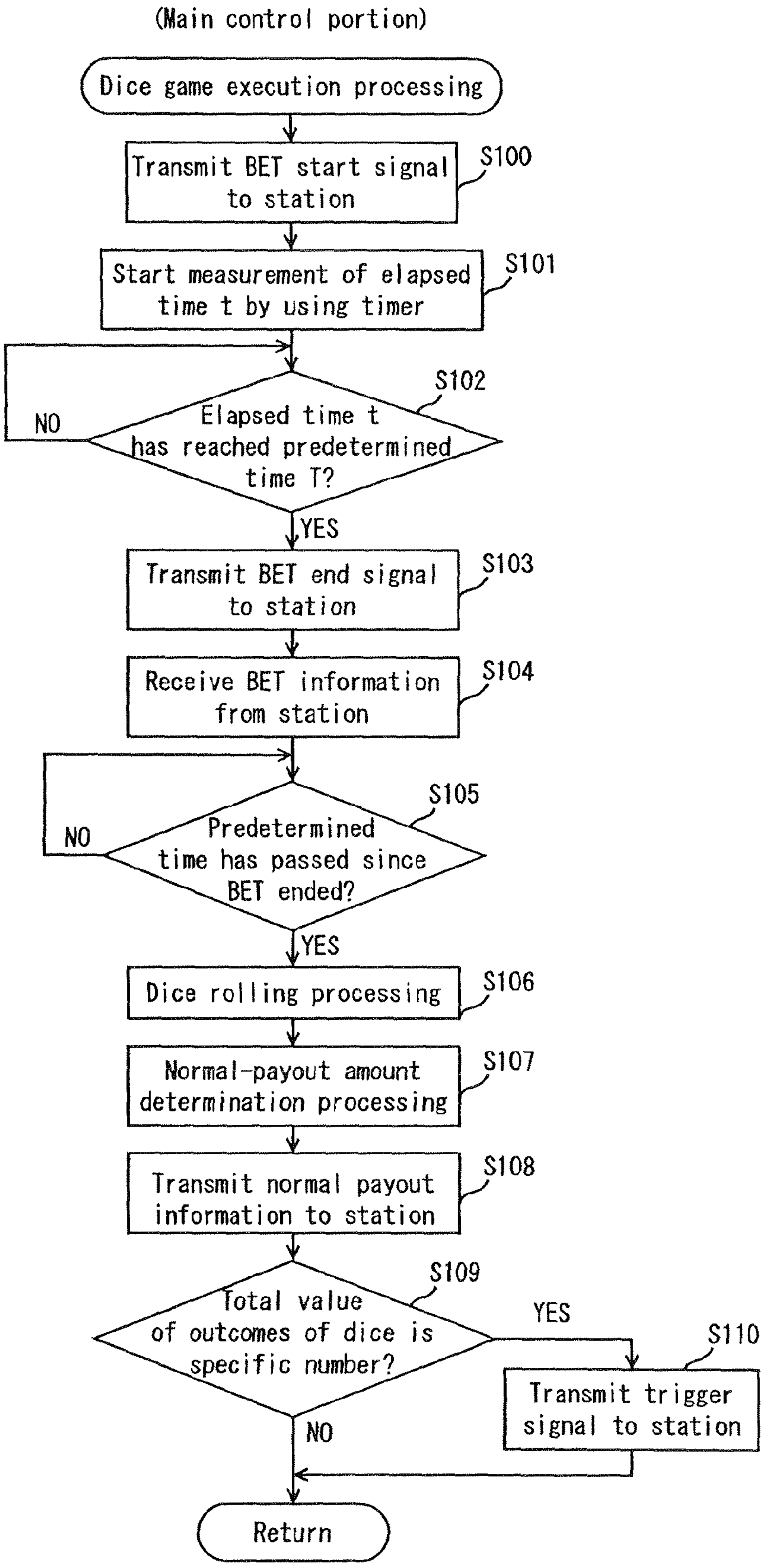
FIG. 9 is a flowchart showing a subroutine of dice game execution processing that is performed in a main control portion.

FIG. 9 is a flowchart showing a subroutine of dice game execution processing that is performed in the main control portion.

In step S100, first the CPU 81 transmits a BET start signal to each station 4.

In step S101, the CPU 81 starts measurement of elapsed time t by using the timer 131. Next, the CPU 81 compares the elapsed time t measured by the timer 131 with data indicating predetermined time T stored in the ROM 82, and then determines whether or not the elapsed time t measured by the timer 131 has reached the predetermined time T (step S102).

When determining in step S102 that the elapsed time t has not reached the predetermined time T, the CPU 81 returns the processing to step S102. On the other hand, when determining in step S102 that the elapsed time t has reached the predetermined time T, the CPU 81 transmits a BET end signal to each station 4 (step S103).

The CPU 81 then receives BET information from each station 4 (step S104). The BET information is information on the normal BET input and the side BET input which were made in each station 4.

After completion of betting in each station 4, the CPU 81 determines whether or not predetermined time (TT) has elapsed (step S105). In this processing, the CPU 81 determines whether or not the difference between the elapsed time t measured by the timer 131 and the predetermined time T stored in the ROM 82 has become a specific value TT stored in the ROM 82. More specifically, the CPU 81 first subtracts the predetermined time T stored in the ROM 82 from the elapsed time t measured by the timer 131. The CPU 81 further compares the numeric value obtained by the subtraction with the specific value TT stored in the ROM 82, and determines whether or not the numeric value obtained by the subtraction has become the specific value TT stored in the ROM 82. By appropriately setting data showing the specific value TT, setting can be made such that processing of rolling the dice 70 can be performed at a desired timing.

When determining in step S105 that the predetermined time (TT) has not elapsed after completion of betting in each station 4, the CPU 81 returns the processing to step S105. On the other hand, when determining in step S105 that the predetermined time (TT) has elapsed after completion of betting in each station 4, the CPU shifts the processing to step S106.

The CPU 81 executes processing of rolling the dice 70 in step S106. In the processing, based on the data and programs stored in the ROM 82 and the RAM 83, the CPU 81 controls the rotating-plate driving motor 300A, the stopping-plate driving motor 300B and the carriage driving motor 300C so as to perform control of throwing in the dice 70, control of rolling the dice 70, control of stopping the dice 70, and the like. Further, the CPU 81 executes control processing associated with the proceeding of the game, such as processing of checking the outcome of each of the dice 70 having stopped on the stopping plate 3*c* and the like.

When the CPU 81, the ROM 82 and the RAM 83 operate together to execute the processing in step S106, the CPU 81, the ROM 82 and the RAM 83 function as the controller that executes the processing (C) in the present invention. Further, step S106 corresponds to the step (C) in the present invention.

In step S107, the CPU 81 executes normal-payout amount determination processing. In the processing, the CPU 81 executes winning determination processing, based on the information on the outcomes of the dice 70 having stopped on the stopping plate 3*c* and the BET information received from each station 4. The CPU 81 then calculates an amount of game media (normal payout amount) to be paid out at each station 4 with reference to the payout table stored in the ROM 82.

Next, the CPU 81 transmits to each station 4 normal payout information showing a normal payout amount in each station 4 (step S108).

Subsequently, based upon the information on the outcomes of the dice 70 having stopped on the stopping plate 3*c*, the CPU 81 determines whether or not the total value of the outcomes of the dice is the specific number (8) (step S109). When determining that the total value of the outcomes of the dice is the specific number (8), the CPU 81 transmits a trigger signal to each station 4. The trigger signal is a signal that triggers execution of processing for offering of the additional payout in each station 4 based upon the total value of the outcomes of the dice becoming the specific number (8).

When determining in step S109 that the total value of the outcomes of the dice is not the specific number (8), or after executing the processing in step S110, the CPU 81 completes the present subroutine.

In the above, the processing performed in the main control portion 80 was described.

Next, the processing performed in the station 4 is described.

Figure 10:
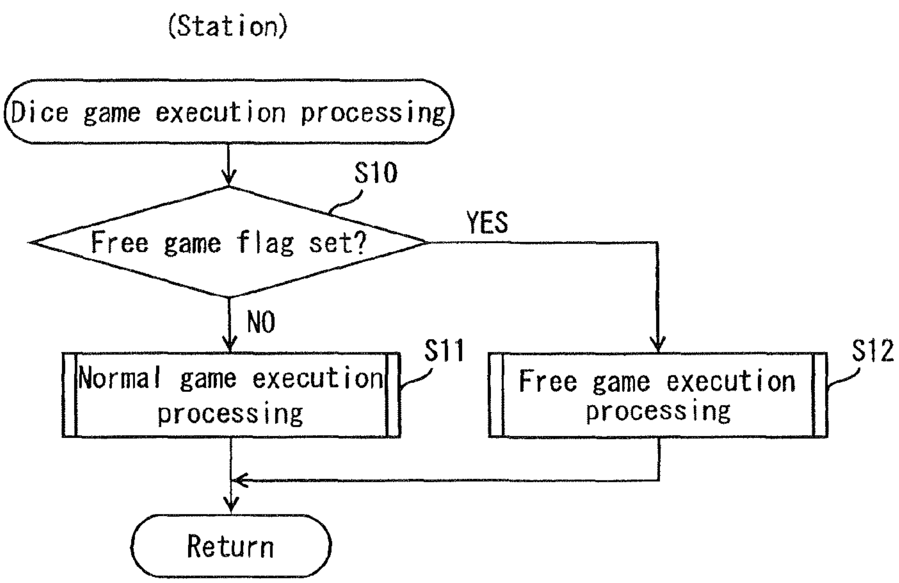
FIG. 10 is a flowchart showing a subroutine of dice game execution processing that is performed in a station.

FIG. 10 is a flowchart showing a subroutine of dice game execution processing performed in the station.

First, the CPU 111 determines whether or not a free game flag has been set (step S10). The free game flag is a flag that is set in the station 4 where the side BET has been placed when the total value of the outcomes of the dice becomes the specific number (8), as well as a flag showing that the free game is in operation (cf. step S35 in FIG. 11B).

When determining that the free game flag has not been set, the CPU 111 executes the normal game execution processing (step 51). On the other hand, when determining that the free game flag has been set, the CPU 111 executes the free game execution processing (step S12). After executing the processing in step S11 or step S12, the CPU 111 completes the present subroutine.

Figure 11A:
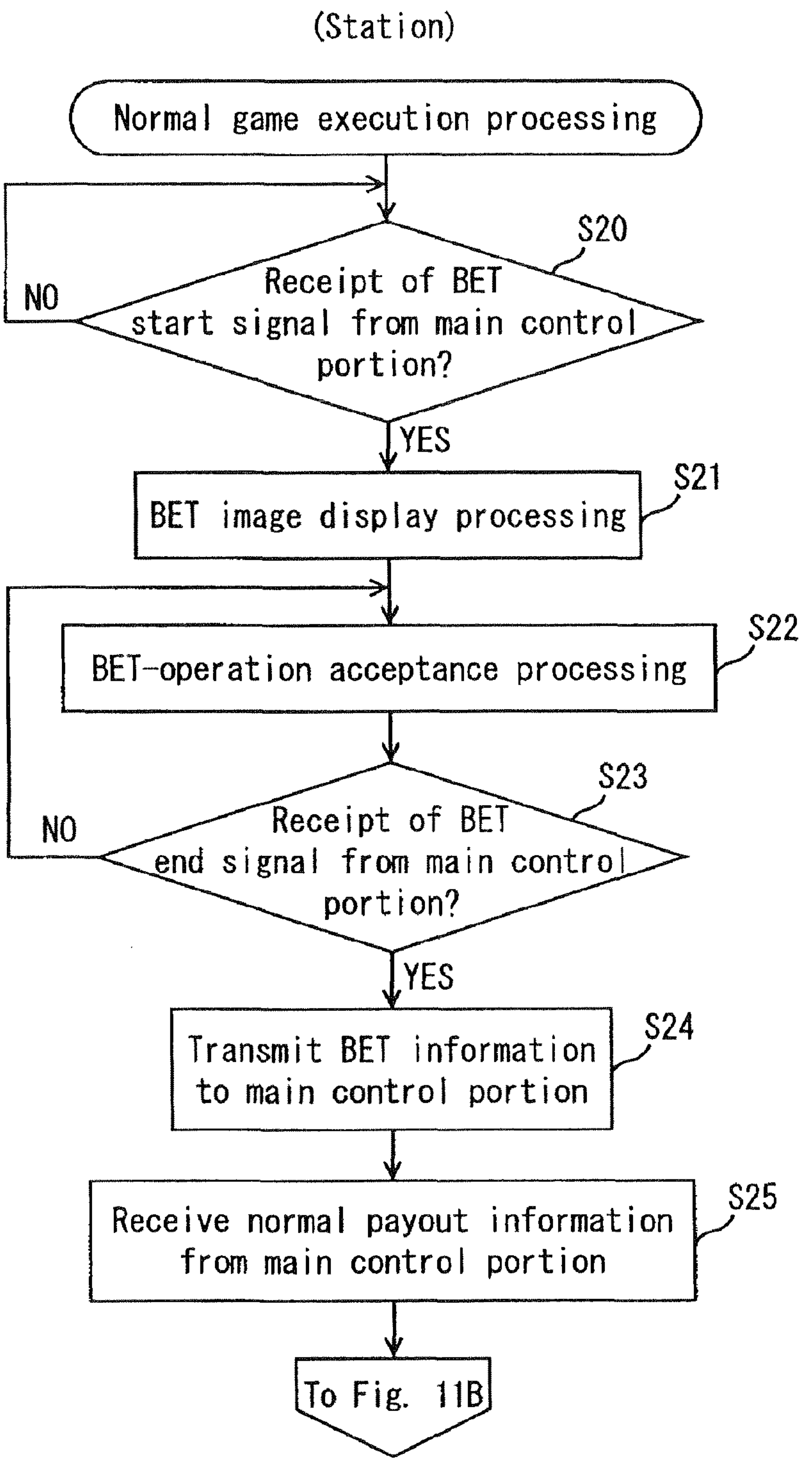
FIG. 11A is a flowchart showing a subroutine of normal game execution processing that is performed in the station.
Figure 11B:
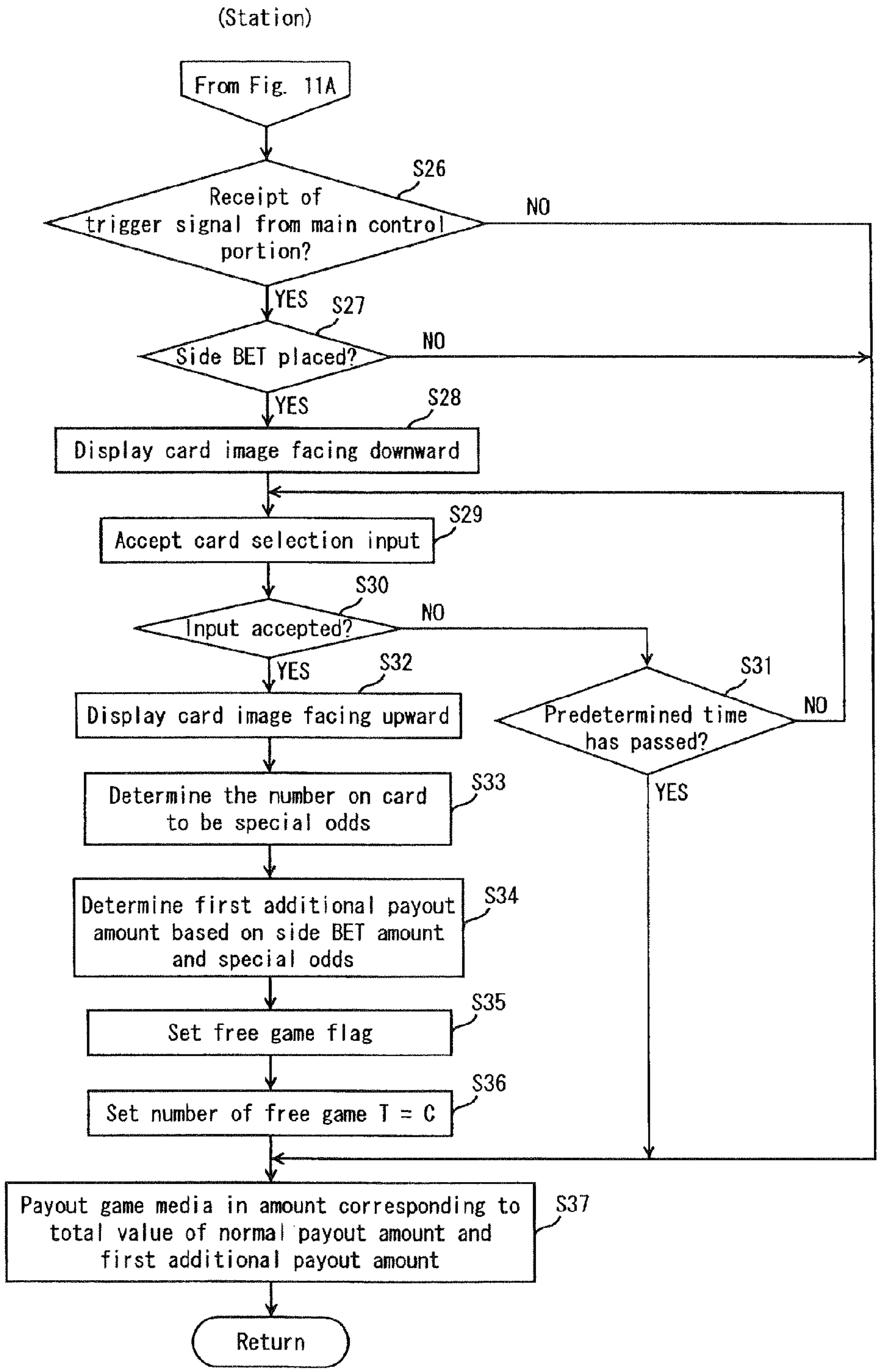
FIG. 11B is a flowchart showing a subroutine of normal game execution processing that is performed in the station.

FIGS. 11A and 11B are flowcharts each showing a subroutine of normal game execution processing that is performed in the station.

First, in step S20, the CPU 111 determines whether or not a BET start signal has been received from the main control portion 80. When determining that the BET start signal has not been received, the CPU 111 returns the processing to step S20. On the other hand, when determining that the BET start signal has been received, the CPU 111 shifts the processing to step S21.

The CPU 111 executes BET-image display processing in step S21. In the processing, the CPU 111 displays the BET screen 40 shown in FIG. 6 to the image display 7.

The CPU 111 executes BET-operation acceptance processing in step S22. In the processing, the CPU 111 accepts a normal BET input and a side BET input by the player through the touch panel 35. Further, in this processing, the CPU 111 makes the RAM 113 store information on the side BET input as the side BET information.

When the CPU 111, the ROM 112 and the RAM 113 operate together to execute the processing in step S22, the CPU 111, the ROM 112 and the RAM 113 function as the controller that executes the processing (A) and (B) in the present invention. Further, step S22 constitutes the step (A) and the step (B) in the present invention.

Next, the CPU 111 determines whether or not a BET end signal has been received from the main control portion 80 (step S23). When determining that the BET end signal has not been received, the CPU 111 returns the processing to step S22. On the other hand, when determining that the BET end signal has been received, the CPU 111 shifts the processing to step S24.

The CPU 111 transmits the BET information to the main control portion 80 in step S24. In the processing, the CPU 111 transmits to the main control portion 80 information regarding the normal BET input and the side BET input, the information having been accepted in step S22, as BET information. It is to be noted that the BET information includes the identification number of the station 4.

Next, the CPU 111 receives the normal payout information from the main control portion 80 (step S25).

Subsequently, the CPU 111 determines whether or not the trigger signal has been received from the main control portion 80 (step S26).

When determining that the trigger signal has been received, the CPU 111 determines in step S22 whether or not the side BET has been placed based upon the side BET information stored in the RAM 113 (step S27).

When determining that the side BET has been placed, the CPU 111 displays the card images 101A to 101E showing five cards facing downward to the image display 7 (see FIG. 1B) (step S28).

When the CPU 111, the ROM 112 and the RAM 113 operate together to execute the processing in step S28, the CPU 111, the ROM 112 and the RAM 113 function as the controller that executes the processing (E-1) in the present invention.

Next, the CPU 111 accepts an input indicating selection of one card (step S29). At this time, the player can select one card by touching a place on the touch panel 35 which corresponds to a card image showing one arbitrary card.

When the CPU 111, the ROM 112 and the RAM 113 operate together to execute the processing in step S29, the CPU 111, the ROM 112 and the RAM 113 function as the controller that executes the processing (E-2) in the present invention.

Next, the CPU 111 determines whether or not the input indicating selection of the card from the touch panel 35 has been made (step S30). In this processing, the CPU 111 determines whether or not a signal transmitted from the touch panel 35 has been received, the signal being transmitted by touching the place on the touch panel 35 which corresponds to the card image.

When determining that the input indicating selection of the card has not been made, the CPU 111 determines whether or not predetermined time has elapsed after displaying the card images 101A to 101E in step S28 (step S31). When determining that the predetermined time has not elapsed, the CPU 111 returns the processing to step S29.

When determining in step S30 that the input indicating selection of the card has been made, the CPU 111 changes the mode of displaying the card images 101A to 101E so as to display the card images 101A to 101E facing upward (see FIG. 1C) (step S32). At this time, as shown in FIG. 1C, the CPU 111 displays the card selected by the player in a different mode from the other cards.

In this processing, the CPU 111 determines five numbers by means of random numbers out of numbers relating to the specific number (8), and displays the determined five numbers respectively on the card images. Namely, in the present embodiment, the numbers are allocated to the respective cards after selection of the card by the player. However, in the present invention, the respective numbers may be allocated to the cards prior to selection of the card by the player.

Next, the CPU 111 determines the number displayed on the card selected by the player as the special odds (step S33). As described above, the special odds are a value to be referenced in offering of the additional payout. In this processing, the CPU 111 makes special odds data showing the determined special odds stored in a predetermined region (special odds storing region) of the RAM 113.

Subsequently, the CPU 111 determines the number of game media, obtained by multiplying the number of game media placed on the side BET by the special odds, as the first additional payout amount based upon the side BET information stored in the RAM 113 and the special odds data (step S34).

The CPU 111 then sets the free game flag (step S35). As described above, the free game flag is a flag that is set in the station 4 where the side BET has been placed when the total value of the outcomes of the dice becomes the specific number (8), as well as a flag showing that the free game is in operation.

Next, the CPU 111 sets the remaining number T of free games to T=C (C=10 in the present embodiment) in a predetermined region (number-of-free-games storing region) of the RAM 113 (step S36).

When determining in step S26 that the trigger signal has not been received, or when determining in step S27 that the side BET has not been placed, or when determining in step S31 that the predetermined time has elapsed, or when the processing in step S36 has been executed, the CPU 111 performs processing relating to payout of game media (step S37).

Specifically, the CPU 111 updates the number of credits of the player stored in the RAM 113, and also updates display on the refund result display portion 45 and the number-of-credits display portion 46.

When determining in step S26 that the trigger signal has not been received, or when determining in step S27 that the side BET has not been placed, or when determining in step S31 that the predetermined time has elapsed, the CPU 111 performs processing of payout of game media in number corresponding to the normal payout amount shown by the normal payout information received from the main control portion 80 in step S25. When the CPU 81, the ROM 82, the RAM 83, the CPU 111, the ROM 112, and the RAM 113 operate together to execute this processing, the CPU 81, the ROM 82, the RAM 83, the CPU 111, the ROM 112, and the RAM 113 function as the controller that executes the processing (D) in the present invention.

In the present embodiment, when the player does not select a card even after the lapse of predetermined time, the additional payout is not provided. However, in the present invention, one card may be automatically selected by means of a random number after the lapse of predetermined time, and the special payout may be provided based upon the number corresponding to the card.

On the other hand, when the processing in step S36 has been executed, the CPU 111 performs processing according to payout of game media in number corresponding to a total of the normal payout amount shown by the normal payout information received from the main control portion 80 in step S25 and the first additional payout amount determined in step S34.

When the CPU 81, the ROM 82, the RAM 83, the CPU 111, the ROM 112, and the RAM 113 operate together to execute this processing, the CPU 81, the ROM 82, the RAM 83, the CPU 111, the ROM 112, and the RAM 113 function as the controller that executes the processing (E) in the present invention.

In the present embodiment, the additional payout is offered in every station 4 where the side BET has been placed when the total value of the outcomes of the dice becomes the specific number. However, in the present invention, in a case where a plurality of stations where the side BET has been placed exist when the total value of the outcomes of the dice becomes the specific number, the additional payout may be offered only in some of the stations. In this case, stations where the additional payout is offered may be determined based upon the amount of game media having been placed on the normal BET or the side BET in each station. Further, the amount of game media to be offered as the additional payout may be varied depending upon the amount of game media having been placed on the side BET or the normal BET.

Figure 12A:
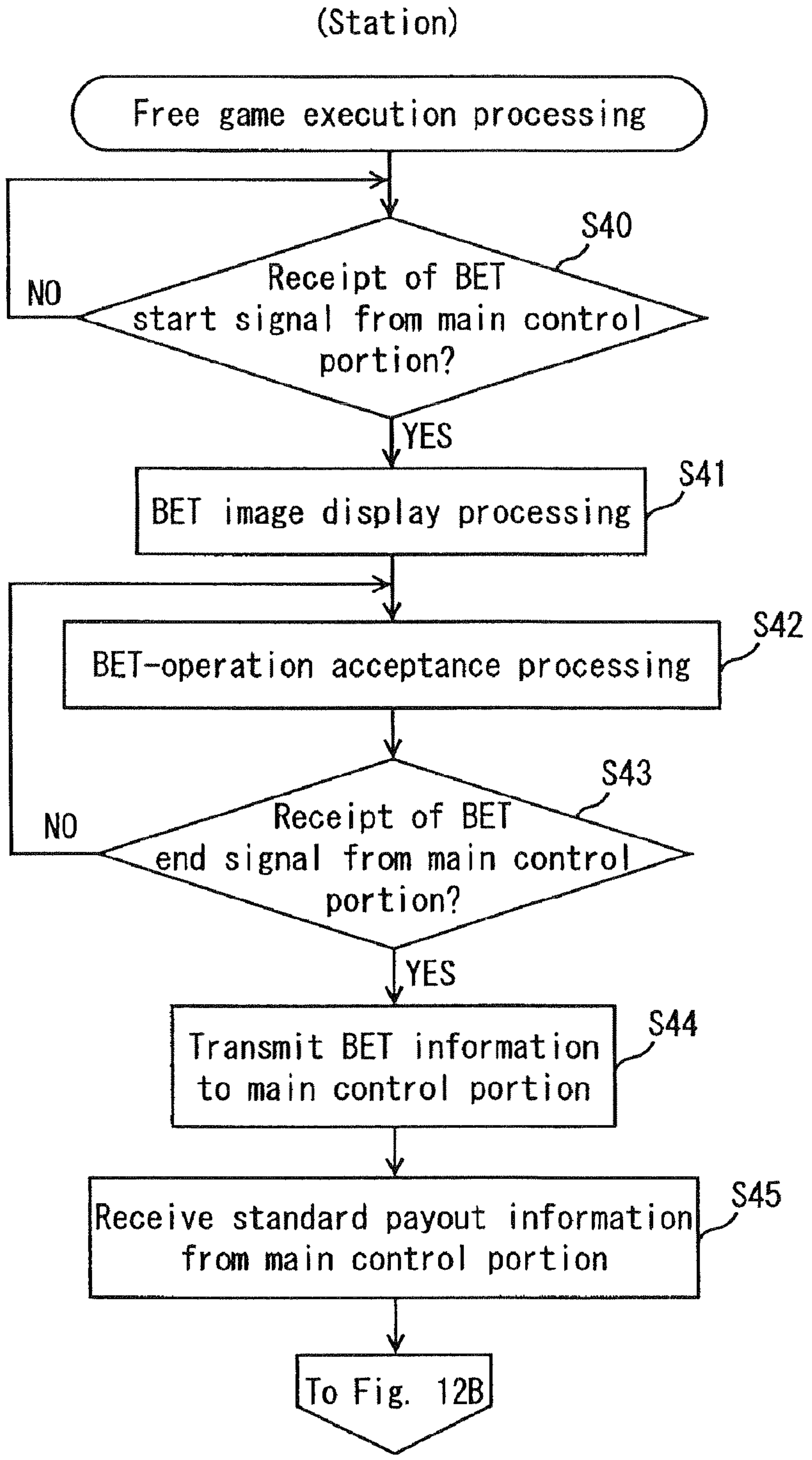
FIG. 12A is a flowchart showing a subroutine of free game execution processing that is performed in the station.
Figure 12B:
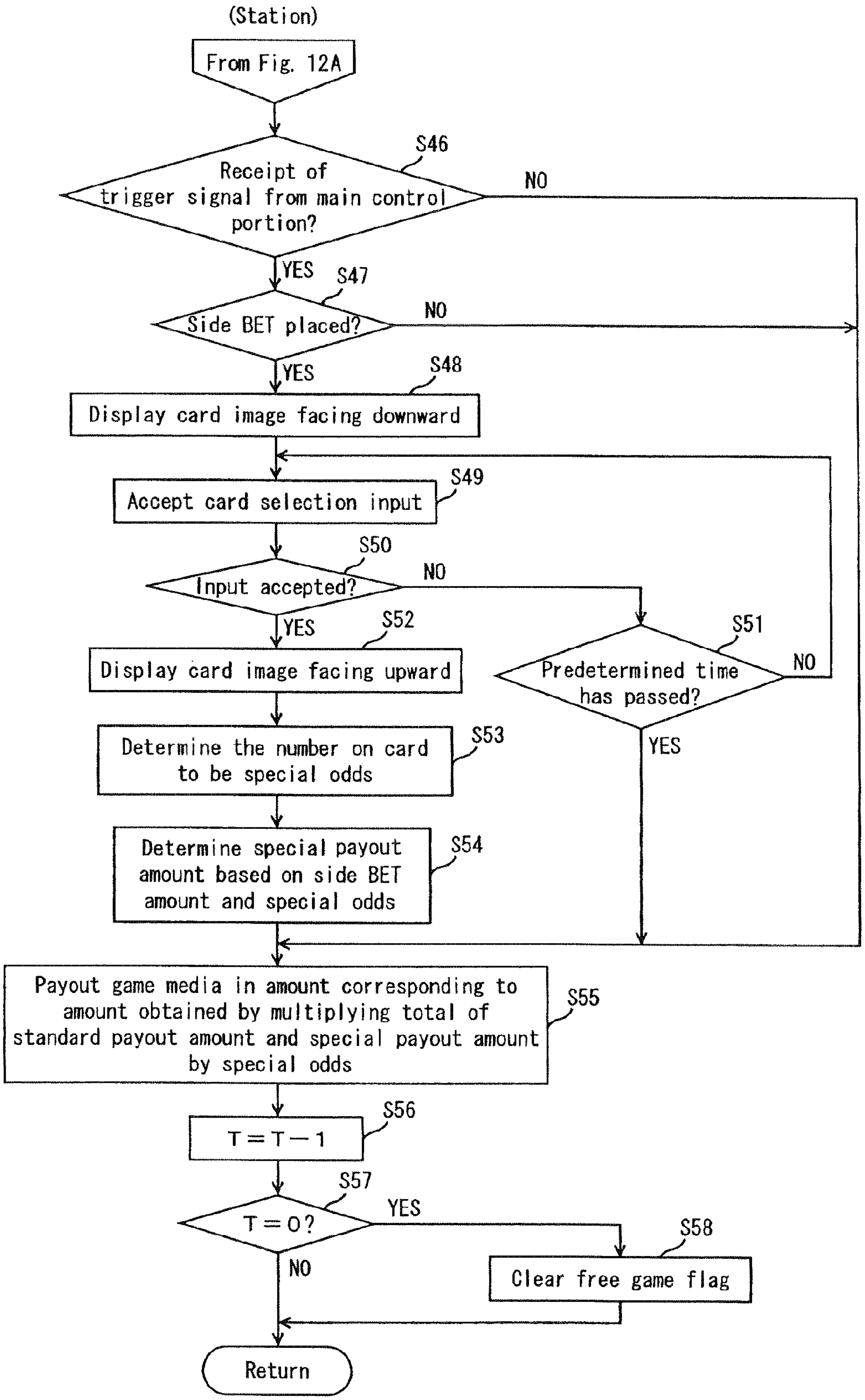
FIG. 12B is a flowchart showing a subroutine of free game execution processing that is performed in the station.

FIGS. 12A and 12B are flowcharts each showing a subroutine of the free game execution processing that is performed in the station.

First, the CPU 111 executes processing in steps S40 to S54. However, descriptions of those processing are omitted here since those processing are the same as the processing in steps S20 to S34 in FIGS. 11A and 11B.

It is to be noted that, while the payout information received by the CPU 111 from the main control portion 80 in step S25 is referred to as the normal payout information, payout information received by the CPU 111 from the main control portion 80 in step S45 is referred to as standard payout information. Further, while the payout amount determined in step S34 was referred to as the first additional payout amount, a payout amount determined in step S54 is referred to as a special payout amount.

Moreover, in step S42, the player can place the normal BET with game media in the same number as the number of game media placed on the normal BET in the normal game (normal game in which the total value of the outcomes of the dice became 8) having triggered generation of the free game, without a decrease in number of credits. On the other hand, as for the side BET, the number of credits decreases by the number of game media placed on the side BET.

Furthermore, in step S53, the CPU 111 overwrites and stores the special odds data showing the determined special odds in the predetermined region (special odds storing region) of the RAM 113. Namely, in the present embodiment, the special odds can be changed to a new value when the total value of the outcomes of the dice becomes the specific number during the free game.

When determining in step S46 that the trigger signal has not been received, or when determining in step S47 that the side BET has not been placed, or when determining in step S51 that the predetermined time has elapsed, or after execution of the processing in step S54, the CPU 111 performs processing regarding payout of game media (step S55).

In this processing, when determining in step S46 that the trigger signal has not been received, or when determining in step S47 that the side BET has not been placed, or when determining in step S51 that the predetermined time has elapsed, the CPU 111 performs processing regarding payout of game media in number corresponding to an amount obtained by multiplying the standard payout amount shown by the standard payout information received from the main control portion 80 in step S45 by the special odds shown by the special odds data stored in the special odds storing region of the RAM 113.

On the other hand, when executing the processing in step S54, the CPU 111 performs processing regarding payout of game media in number corresponding to an amount obtained by multiplying a total of the standard payout amount shown by the standard payout information received from the main control portion 80 in step S45 and the special payout amount determined in step S54 by the special odds shown by the special odds data stored in the special odds storing region of the RAM 113.

Next, the CPU 111 sets the remaining number T of free games to T=T−1 in the number-of-free-game storing region of the RAM 113 (step 556).

Subsequently, the CPU 111 determines whether or not T=0 (step S57).

When determining that T is not 0, the CPU 111 completes the present subroutine.

On the other hand, when determining that T is 0, the CPU 111 clears the free game flag (step S58), and completes the subroutine.

In the above, the present embodiment has been described.

In the present embodiment, the free game is played when triggered by the total value of the outcomes of the dice being the specific number. However, the bonus game in the present invention is not restricted to this example. For example, a game may be played in which betting is necessary as in the normal game, but a payout amount is multiplied by special odds.

Further, a game different from the dice game (e.g. card game such as poker) may be played. Also in this case, a payout amount may be multiplied by special odds.

Moreover, this game may be played only once or repeated a plurality of times. When the game is repeated a plurality of times, the number of games may be determined based upon a specific number.

Furthermore, although the number whose number of one digit is the specific number is cited as an example of the number relating to the specific number in the present embodiment, the number relating to the specific number in the present invention is not restricted to this example. For example, the number relating to the specific number in the present invention may be a multiple of the specific number.

According to the above-mentioned gaming machine 1 of the present embodiment, the player can place two kinds of BETs, which are a normal BET and a side BET. When the side BET is placed, not only a normal payout based upon the normal BET but also an additional payout based upon the side BET can be offered. It is thereby possible to increase options in betting, so as to provide a player with a game in which the player hardly feels bored.

Further, according to the gaming machine 1 of the present embodiment, in a case where a total value of the outcomes of dice is a specific number (8), an additional payout is offered based upon the specific number (8) on condition that the side BET has been placed. Namely, the specific number is a condition for offering of the additional payout, and at the same time relates to the number of game media to be offered as the additional payout. Therefore, the specific number is of extreme importance for the player, and it is thereby possible to make the player have an interest in the specific number. This can thus improve the interesting aspect of the game.

Moreover, according to the gaming machine 1 of the present embodiment, a number "8" which is considered to bring luck in Japan, China and the like is set as the specific number. Therefore, when the gaming machine 1 is installed in Japan, China and the like, an interest of the player on such a specific number considered to bring luck can be further increased. It is thereby possible to make the player absorbed in the game, so as to provide a game in which the player hardly feels bored even when the player keeps playing the game for a long period of time.

Further, according to the gaming machine 1 of the present embodiment, when the total value of the outcomes of the dice is the specific number (8), the card images 101A to 101E are displayed to the image display 7 on condition that the side BET has been placed. The card shown by the card images are respectively corresponded to numbers (8, 18, 88, etc.) relating to the specific number (8), and the card images are displayed to the display on such a mode that the numbers are invisible for the player (i.e. facing downward). The player can select (turn over) one card. Based upon the number corresponding to the selected card, the additional payout is offered.

As thus described, since the number corresponding to the card selected by the player becomes a reference in determining the additional payout amount, selection of a card is a significant selection for the player. It is thus possible to make the player fully enjoy the game through such a selection.

Moreover, since each card is corresponded to a number relating to the specific number, it is possible to further raise the interest of the player on the specific number.

Further, according to the gaming machine 1 of the present embodiment, the larger the number of game media placed on the side BET is, the larger number of game media are paid as the additional payout. This can prompt the player to place the side BET with a large number of game media, thereby profit of a game parlor can be increased.

Further, according to the gaming machine 1 of the present embodiment, the larger the number corresponding to the selected card is, the larger number of game media are paid as the additional payout. Therefore, the player wishes to select a card corresponding to as large a number as possible. The larger the number corresponding to the card selected by the player is, the more pleasure the player can feel. It is thus possible to make the player absorbed in the game through such card selection.

Further, according to the gaming machine 1 of the present embodiment, triggered by the total value of the outcomes of the dice being the specific number, a free game is played. In the free game, game media is paid in an amount calculated based upon a game result and the number corresponding to the selected card. Namely, the larger the number corresponding to the selected card is, the larger the number of game media to be paid during the free game becomes.

It is therefore possible to make the player have a sense of expectation that the total value of the outcomes of the dice will become the specific number and also make the player absorbed in selecting a card corresponding to as large a number as possible. Accordingly, a game in which the player hardly feels bored even when the game is played for a long period of time can be provided.

Moreover, when having placed the side BET in a game in which the total value of the outcomes of the dice becomes the specific number, the player can thereafter play a game without placing a BET (namely, free of charge). And, even though the player can play a game free of charge, there is a possibility of acquiring a great number of game media in the free game when the number corresponding to the card selected by the player is large.

It is therefore possible to further increase the expectation of the player for the total value of the outcomes of the dice to become the specific number and for selecting a card corresponding to a large number.

Although the case has been described in the present embodiment where the real dice 70 roll in the gaming portion 3, a configuration may be employed in the present invention in which a main image display is installed separately from the image display provided in the station and an image showing the dice in a state of rolling is displayed to the main image display, without using real dice.

In this case, the CPU 81 is connected, through the I/O interface 90, with a random number generator 130B and a liquid crystal driving circuit 120B equivalent to the liquid crystal driving circuit 120 provided in the station 4. Further, the CPU 81 is connected with a main image display 701 through the liquid crystal driving circuit 120B.

The CPU 81 determines the outcome of each of the dice 70 by means of a random number. The CPU then displays an image showing the state of rolling of the dice 70 to the main image display 701. The CPU 81 further displays an image showing the dice 70 in a state of stopping with the outcomes of the determined value to the main image display 701.

Although the embodiment of the present invention in which the real dice 70 rotate in the gaming portion 3 has been described in the above, the present invention may also include a configuration in which the real dice are not used but an image showing dice in a state of rolling is displayed to the image display in the station.

In this case, the CPU is connected to the random number generator 130B through the I/O interface 90.

The CPU 81 determines the outcome of each of the dice 70 by means of a random number, and transmits information on the determined value of the outcome of each of the dice 70 to each station 4. Each station 4 then displays an image showing the dice 70 in a state of rolling to the image display 7. Further, an image showing the dice 70 in a state of stopping is displayed to the image display 7 based upon the received information on the value of the outcome of each of the dice 70.

Although the case has been described in the present embodiment where the image display is not installed in anyplace other than the station 4, a configuration may be employed in the present invention in which the main image display is installed in the gaming machine separately from the image display provided in the station and an image showing the state of rolling of the dice in the gaming portion is displayed to the main image display.

In this case, the CPU 81 is connected, through the I/O interface 90, with a dice photographing device having a CCD camera 17B and the liquid crystal driving circuit 120B equivalent to the liquid crystal driving circuit 120 provided in the station 4. Further, the CPU 81 is connected with the dice photographing device through the liquid crystal driving circuit 120B. The CCD camera 17B provided in the dice photographing device is installed at an angle that allows photographing of the gaming portion 3.

The CPU 81 displays an image showing the dice 70 in a state of rolling in the gaming portion 3 to the main image display 701, based on the signal transmitted from the dice photographing device.

Although the case was described in the present embodiment where the image of the dice 70 is not displayed to the image display 7 in the station 4, the present invention may also include a configuration in which an image showing the dice in a state of rolling in the gaming portion is displayed to the image display in the station.

In this case, the CPU 81 is connected to the dice photographing device equipped with a CCD camera 17B through the I/O interface 90. The CCD camera 17B in the dice photographing device is installed at such an angle as to be able to photograph the gaming portion 3.

The CPU 81 transmits a signal transmitted from the dice photographing device to each station. The CPU 111 then displays to the image display 7 an image showing the dice 70 in a state of rolling in the gaming portion 3 based upon the signal received from the main control portion 80.

Although the case has been described in the present embodiment where the outcomes of the dice 70 are detected using the CCD camera 17, the method for detecting the outcomes of the dice is not particularly limited in the present invention. For example, an identifiable device, such as a device reactive to magnetism, may be previously imbedded inside each of the dice, and its outcome may be detected by the use of a magnetic change in the device. Moreover, an optical sensor may be used to detect the outcomes of the dice.

Although the case has been described in the present embodiment where the dice 70 are rolled using the rotating-plate driving motor 300A, the stopping-plate driving motor 300B and the carriage driving motor 300C, the method for rolling the dice is not particularly limited; for example, a configuration may be employed in which the dice are rolled on a vibration plate. Further, the dice may not be collected, but may be in a constantly exposed state inside the gaming portion.

Although the case was described in the present embodiment where the number of the dice 70 is three, the number of die is not restricted in the present invention, and for example, the number of die may be five.

Although the case has been described in the present embodiment where the controller in the present invention includes the CPU 81 provided in the main control portion 80 and the CPU 111 provided in the station 4, the controller in the present invention may be configured by a single CPU.

Although the specific number has been previously set in the embodiment described above, it is also possible to employ a configuration such that the player can set the specific number.

Figure 13:
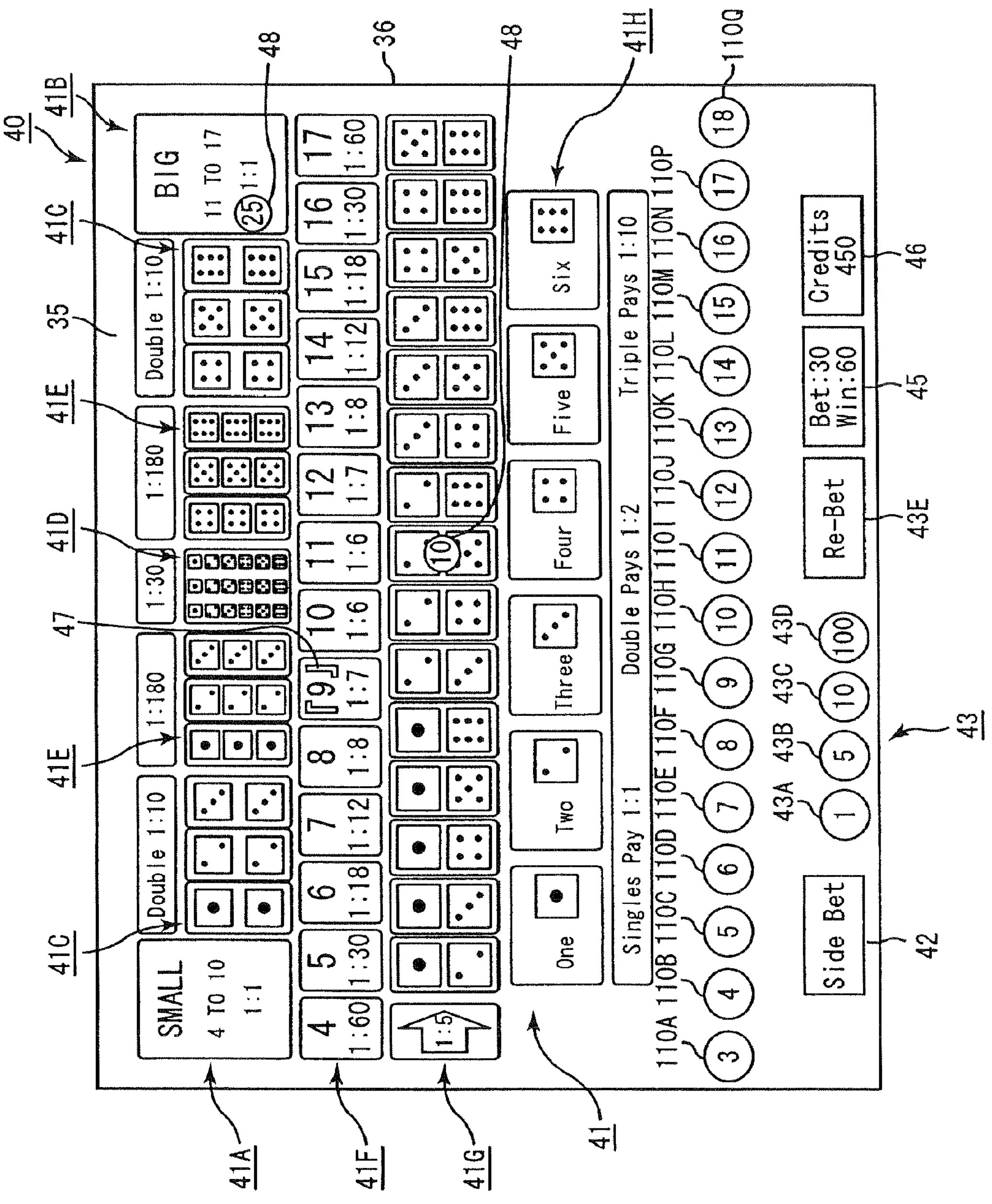
FIG. 13 is a view showing one example of a display screen displayed to the image display according to the present invention.

FIG. 13 is a view showing one example of display screens displayed to the image display according to another embodiment. In the following, structural components which are the same with those of the gaming machine 1 according to the foregoing embodiment are described by applying the same numerals.

Further, descriptions of the portions to which the descriptions in the foregoing embodiment are applicable will be omitted.

FIG. 13 shows the BET screen 40.

On the BET screen 40 of FIG. 13, a specific number setting button image 110 (110A to 110Q) is displayed. The player can set an arbitrary number as the specific number by touching a place on the touch panel 35 that corresponds to the specific number setting button image 110 corresponding to the number the player wishes to set as the specific number during a period when the normal BET and the side BET can be placed (BET period).

Figure 14:
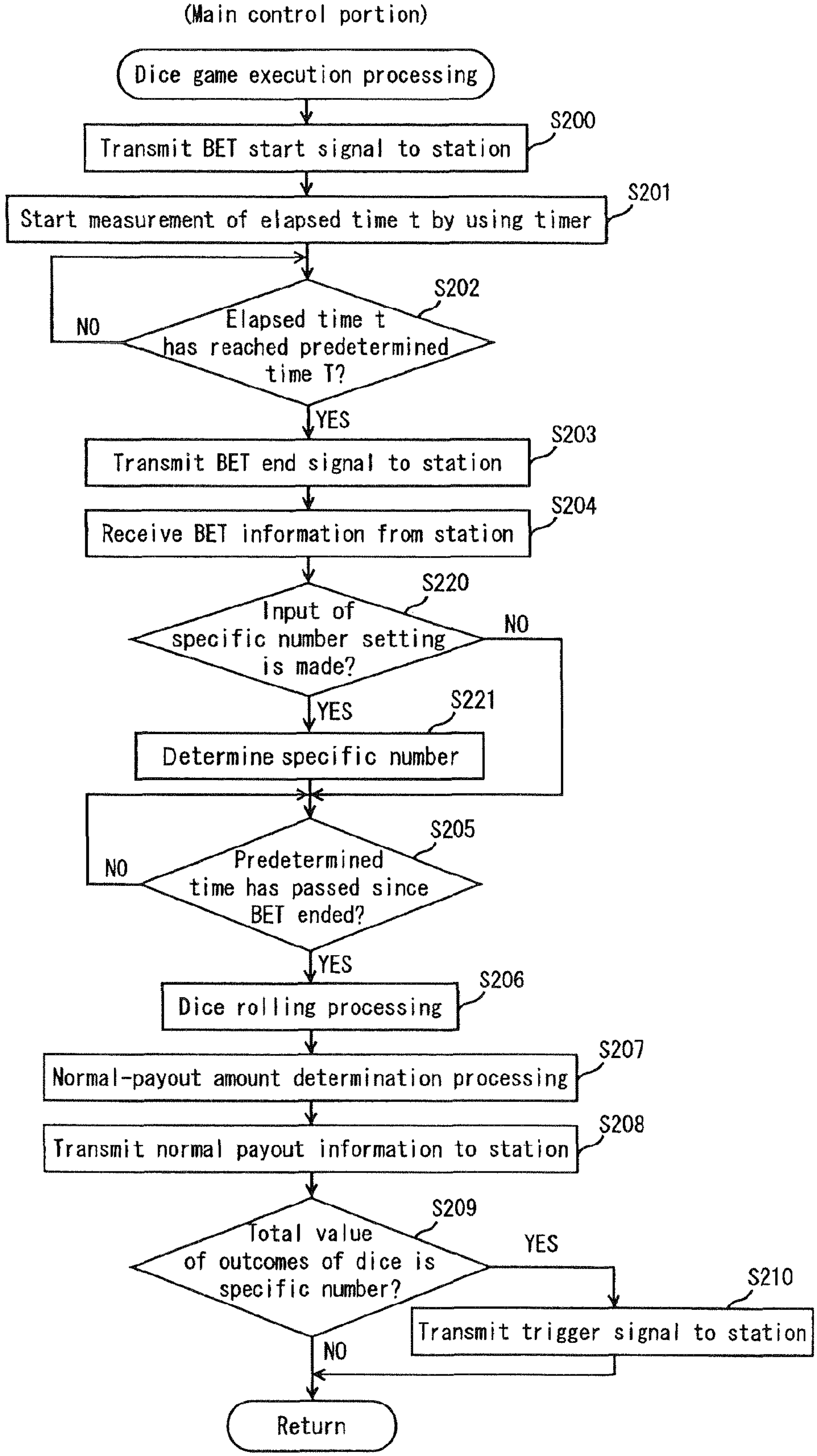
FIG. 14 is a flowchart showing a subroutine of dice game execution processing that is performed in a main control portion according to the present invention.

FIG. 14 is a flowchart showing a subroutine of the dice game execution processing that is performed in a main control portion according to another embodiment.

First, the CPU 81 executes processing in steps S200 to S204. However, descriptions of the proceeding is omitted since those processing are the same as the processing in steps S100 to S104 in FIG. 9.

After executing the processing in step S204, the CPU 81 determines whether or not the input indicating setting of the specific number has been made (step S220). In this processing, the CPU 81 determines whether or not the specific number setting information is included in the BET information received in step S204.

When a place on the touch panel 35, which corresponds to the specific number setting button image 110 corresponding to any number, is touched during the BET period, the CPU 111 in the station 4 transmits BET information to the main control portion 80 in such a manner that information showing the number (specific number setting information) is included in the BET information.

When determining that the input indicating setting of the specific number has been made, the CPU 81 determines the number shown by the specific number setting information as the specific number (step S221). In this processing, the CPU 81 makes the determined specific number stored in a predetermined region (specific number storing region) of the RAM 83 with the specific number corresponded to an identification number of the station 4 serving as a transmission source of the specific number setting information.

When determining in step S220 that the input indicating setting of the specific number has not been made, or after executing the processing in step S221, the CPU 81 shifts the processing to step S205.

Subsequently, the CPU 81 executes the processing in step S205 to S208. However, descriptions of the proceeding is omitted since those processing are the same as the processing in steps S105 to S108 in FIG. 9.

After executing the processing in step S208, the CPU 81 determines whether or not the total value of the outcomes of the dice is the specific number set in any of the stations 4 (step S209). In this processing, the CPU 81 determines whether or not the same number as the total value of the outcomes of the dice exists among the specific numbers stored in the specific number storing regions of the RAM 83 in association with each of the stations 4.

When determining that the total value of the outcomes of the dice is the specific number set in any of the stations 4, the CPU 81 transmits the trigger signal to the relevant station 4 (step S210).

When determining in step S209 that the total value of the outcomes of the dice is not the specific number set in any of the stations 4, or after executing the processing in step S210, the CPU 81 completes the present subroutine.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming machine, comprising:

a gaming portion in which a plurality of dice roll and stop;

an input device with which a player can place a normal BET on outcomes of dice and a side BET different from said normal BET; and a controller, said controller programmed to execute the processing of (A) accepting from said input device an input indicating placement of said normal BET, (B) accepting from said input device an input indicating placement of said side BET, (C) rolling and stopping said plurality of dice in said gaming portion, (D) offering a normal payout based upon the outcomes of the plurality of dice stopped in said processing (C) and the normal BET placed in said processing (A), and (E) offering, in a case where a total value of the outcomes of the plurality of dice stopped in said processing (C) is a specific number, an additional payout based upon said specific number on condition that the input indicating placement of the side BET has been made in said processing (B), wherein a display capable of displaying a card image showing a card corresponding to a number relating to said specific number is provided, said input device is a device with which a player can make an input indicating selection of one card out of a plurality of the cards shown by a plurality of the card images displayed to said display, and said processing (E) is the processing of (E-1) displaying said plurality of card images to said display on such a mode that the numbers corresponding to the cards shown by the card images are invisible for the player on condition that the input indicating placement of the side BET has been made in said processing (B), in a case where the total value of the outcomes of the plurality of dice stopped in said processing (C) is the specific number, (E-2) accepting from said input device the input indicating selection of one card out of the plurality of the cards shown by said plurality of card images displayed in said processing (E-1), and (E-3) offering an additional payout to the player based upon the number corresponding to the card selected in said processing (E-2), wherein said processing (E-3) is processing of paying game media in an amount obtained by multiplying an amount of game media placed on the side BET in said processing (B) by the number corresponding to the card selected in said processing (E-2).

2. The gaming machine according to claim 1, wherein said processing (E-3) includes executing a bonus game that is started when the total value of the outcomes of the plurality of dice stopped in said processing (C) has become the specific number, and paying game media in an amount calculated based upon a game result determined in said bonus game and the number corresponding to the card selected in said processing (E-2), and said processing (C) includes rolling and stopping said plurality of dice in said gaming portion during a period when said bonus game is not executed in said processing (E-3).

3. A method for controlling a gaming machine, comprising the steps of:

(A) accepting from an input device an input indicating placement of a normal BET;

(B) accepting from the input device an input indicating a side BET different from said normal BET;

(C) rolling and stopping a plurality of dice in a gaming portion;

(D) offering a normal payout based upon the outcomes of the plurality of dice stopped in said step (C) and the normal BET placed in said step (A); and (E) offering, in a case where a total value of the outcomes of the plurality of dice stopped in said step (C) is a specific number, an additional payout based upon said specific number on condition that the input indicating placement of the side BET has been made in said step (B)

wherein a display capable of displaying a card image showing a card corresponding to a number relating to said specific number is provided, receiving an input indicating selection of one card out of a plurality of the cards shown by a plurality of the card images displayed to said display, and said step (E) is the step of (E-1) displaying said plurality of card images to said display on such a mode that the numbers corresponding to the cards shown by the card images are invisible for the player on condition that the input indicating placement of the side BET has been made in said step (B), in a case where the total value of the outcomes of the plurality of dice stopped in said step (C) is the specific number, (E-2) accepting from said input device the input indicating selection of one card out of the plurality of the cards shown by said plurality of card images displayed in said step (E-1), and (E-3) offering an additional payout to the player based upon the number corresponding to the card selected in said step (E-2), wherein said step (E-3) is step of paying game media in an amount obtained by multiplying an amount of game media placed on the side BET in said step (B) by the number corresponding to the card selected in said step (E-2).

4. The method for controlling the gaming machine according to claim 3, wherein said step (E-3) includes executing a bonus game that is started when the total value of the outcomes of the plurality of dice stopped in said step (C) has become the specific number, and paying game media in an amount calculated based upon a game result determined in said bonus game and the number corresponding to the card selected in said step (E-2), and said step (C) includes rolling and stopping said plurality of dice in said gaming portion during a period when said bonus game is not executed in said step (E-3).

* * * * *